United States Patent
O'Donnell et al.

(10) Patent No.: US 11,913,361 B2
(45) Date of Patent: Feb. 27, 2024

(54) ENERGY STORAGE SYSTEM AND ALUMINA CALCINATION APPLICATIONS

(71) Applicant: Rondo Energy, Inc., Alameda, CA (US)

(72) Inventors: John Setel O'Donnell, Oakland, CA (US); Yusef Desjardins Ferhani, Menlo Park, CA (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 18/144,134

(22) Filed: May 5, 2023

(65) Prior Publication Data
US 2023/0304420 A1    Sep. 28, 2023

Related U.S. Application Data

(60) Continuation-in-part of application No. 18/142,564, filed on May 2, 2023, and a continuation-in-part of
(Continued)

(51) Int. Cl.
*F01K 3/02* (2006.01)
*H02M 1/00* (2006.01)
(Continued)

(52) U.S. Cl.
CPC .............. *F01K 3/02* (2013.01); *B63H 11/00* (2013.01); *F01K 3/08* (2013.01); *F01K 3/186* (2013.01);
(Continued)

(58) Field of Classification Search
CPC ... F01K 3/02; F01K 3/08; F01K 3/186; F01K 15/00; F03G 6/071; H02M 1/007;
(Continued)

(56) References Cited

U.S. PATENT DOCUMENTS 1,700,542 A   1/1929 O'Donnell
2,833,532 A   5/1958 Ries
(Continued)

FOREIGN PATENT DOCUMENTS

AU   2012292959 B2   2/2016
AU   2016204109 B2   5/2018
(Continued)

OTHER PUBLICATIONS

"Ethylene Production via Cracking of Ethane-Propane", Chemical Engineering, Nov. 1, 2015, Total pp. 4.
(Continued)

*Primary Examiner* — Shafiq Mian
(74) *Attorney, Agent, or Firm* — Procopio, Cory, Hargreaves & Savitch LLP; Matt Rainey

(57) ABSTRACT

An energy storage system (TES) converts variable renewable electricity (VRE) to continuous heat at over 1000° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. In one application, the TES provides higher-temperature heat through non-combustible fluid to an alumina calcination system used to remove impurities or volatile substances and/or to incur thermal decomposition to a desired product.

32 Claims, 13 Drawing Sheets

Related U.S. Application Data application No. 18/171,602, filed on Feb. 20, 2023, said application No. 18/142,564 is a continuation-in-part of application No. 17/668,333, filed on Feb. 9, 2022, now Pat. No. 11,702,963, said application No. 18/171,602 is a division of application No. 17/650,522, filed on Feb. 9, 2022, now Pat. No. 11,585,243, and a continuation of application No. PCT/US2021/061041, filed on Nov. 29, 2021, said application No. 17/668,333 is a continuation of application No. 17/537,407, filed on Nov. 29, 2021, now Pat. No. 11,603,776.

(60) Provisional application No. 63/459,540, filed on Apr. 14, 2023, provisional application No. 63/434,919, filed on Dec. 22, 2022, provisional application No. 63/427,374, filed on Nov. 22, 2022, provisional application No. 63/378,355, filed on Oct. 4, 2022, provisional application No. 63/347,987, filed on Jun. 1, 2022, provisional application No. 63/338,805, filed on May 5, 2022, provisional application No. 63/231,155, filed on Aug. 9, 2021, provisional application No. 63/170,370, filed on Apr. 2, 2021, provisional application No. 63/165,632, filed on Mar. 24, 2021, provisional application No. 63/155,261, filed on Mar. 1, 2021, provisional application No. 63/119,443, filed on Nov. 30, 2020.

(51) Int. Cl.

| | |
|---|---|
| *F01K 3/08* | (2006.01) |
| *F01K 3/18* | (2006.01) |
| *F01K 15/00* | (2006.01) |
| *F28D 20/00* | (2006.01) |
| *H01M 8/04014* | (2016.01) |
| *H01M 8/04029* | (2016.01) |
| *H01M 8/04007* | (2016.01) |
| *B63H 11/00* | (2006.01) |
| *F03G 6/00* | (2006.01) |
| *F01K 13/02* | (2006.01) |
| *F22B 29/06* | (2006.01) |
| *F22B 35/10* | (2006.01) |
| *H02J 1/10* | (2006.01) |
| *H02J 3/00* | (2006.01) |
| *H02J 3/04* | (2006.01) |
| *F03D 9/18* | (2016.01) |
| *B63H 11/12* | (2006.01) |
| *B63H 11/14* | (2006.01) |
| *B63H 11/16* | (2006.01) |
| *F01K 11/02* | (2006.01) |
| *F01K 19/04* | (2006.01) |

(52) U.S. Cl.
CPC .............. *F01K 13/02* (2013.01); *F01K 15/00* (2013.01); *F03G 6/071* (2021.08); *F22B 29/06* (2013.01); *F22B 35/10* (2013.01); *F28D 20/00* (2013.01); *H01M 8/04014* (2013.01); *H01M 8/04029* (2013.01); *H01M 8/04037* (2013.01); *H01M 8/04052* (2013.01); *H01M 8/04074* (2013.01); *H02J 1/102* (2013.01); *H02J 3/00* (2013.01); *H02J 3/04* (2013.01); *H02M 1/0003* (2021.05); *H02M 1/007* (2021.05); *B63H 11/12* (2013.01); *B63H 11/14* (2013.01); *B63H 11/16* (2013.01); *F01K 11/02* (2013.01); *F01K 19/04* (2013.01); *F03D 9/18* (2016.05); *F28D 2020/0004* (2013.01); *Y02E 60/14* (2013.01)

(58) Field of Classification Search
CPC .......... H02M 1/0003; H01M 8/04037; H01M 8/04052; H01M 8/04074; H01M 8/04014; H01M 8/04029; H02J 1/102; H02J 3/00; H02J 3/04; B63H 11/00; F22B 29/06; F22B 35/10; F28D 20/00
See application file for complete search history.

(56) References Cited

U.S. PATENT DOCUMENTS

| | | |
|---|---|---|
| 3,381,113 A | 4/1968 | Jacques et al. |
| 3,788,066 A | 1/1974 | Nebgen |
| 4,110,987 A | 9/1978 | Cahn et al. |
| 4,124,061 A | 11/1978 | Mitchell et al. |
| 4,127,161 A | 11/1978 | Clyne et al. |
| 4,146,057 A | 3/1979 | Friedman et al. |
| 4,172,442 A | 10/1979 | Boblitz |
| 4,222,365 A | 9/1980 | Thomson |
| 4,234,782 A | 11/1980 | Barabas et al. |
| 4,438,630 A | 3/1984 | Rowe |
| 5,154,224 A | 10/1992 | Yasui et al. |
| 5,286,472 A | 2/1994 | Fulford |
| 5,384,489 A | 1/1995 | Bellac |
| 5,416,416 A | 5/1995 | Bisher |
| 5,553,604 A | 9/1996 | Frei |
| 7,213,409 B1 | 5/2007 | Nuckols |
| 7,693,402 B2 | 4/2010 | Hudson et al. |
| 8,544,275 B2 | 10/2013 | Shinnar |
| 8,701,773 B2 | 4/2014 | O'Donnell et al. |
| 8,960,182 B2 | 2/2015 | Magaldi et al. |
| 9,370,044 B2 | 6/2016 | McDonald |
| 9,512,826 B2 | 12/2016 | Rodionov et al. |
| 9,816,490 B2 | 11/2017 | Conlon |
| 9,948,140 B2 | 4/2018 | Pietsch et al. |
| 9,989,271 B1 | 6/2018 | Becker |
| 10,113,535 B2 | 10/2018 | Conlon |
| 10,345,050 B2 | 7/2019 | Pietsch et al. |
| 10,775,111 B2 | 9/2020 | Kerth |
| 10,876,521 B2 | 12/2020 | Anderson et al. |
| 11,352,951 B2 | 6/2022 | Apte et al. |
| 11,459,944 B2 | 10/2022 | Robinson |
| 2004/0062063 A1 | 4/2004 | Siri |
| 2004/0099261 A1 | 5/2004 | Litwin |
| 2004/0148922 A1 | 8/2004 | Pinkerton |
| 2004/0182081 A1 | 9/2004 | Sim et al. |
| 2006/0174622 A1 | 8/2006 | Skowronski |
| 2006/0179840 A1 | 8/2006 | Murphy et al. |
| 2006/0211777 A1 | 9/2006 | Severinsky |
| 2006/0266039 A1 | 11/2006 | Skowronski et al. |
| 2008/0000231 A1 | 1/2008 | Litwin et al. |
| 2008/0127647 A1 | 6/2008 | Leitner |
| 2009/0038668 A1 | 2/2009 | Plaisted |
| 2009/0090109 A1 | 4/2009 | Mills et al. |
| 2009/0117633 A1 | 5/2009 | Bradley et al. |
| 2009/0208402 A1 | 8/2009 | Rossi |
| 2009/0320828 A1 | 12/2009 | Koketsu et al. |
| 2010/0132391 A1 | 6/2010 | Barot |
| 2010/0178156 A1 | 7/2010 | Rivas Cortes et al. |
| 2010/0229523 A1 | 9/2010 | Holt et al. |
| 2010/0251711 A1 | 10/2010 | Howes et al. |
| 2010/0295306 A1 | 11/2010 | Ridnik et al. |
| 2011/0226440 A1 | 9/2011 | Bissell et al. |
| 2011/0286902 A1* | 11/2011 | Fan ................. B01J 20/043 |
| | | 422/619 |
| 2011/0289924 A1 | 12/2011 | Pietsch |
| 2012/0102950 A1 | 5/2012 | Turchi |
| 2012/0131898 A1 | 5/2012 | Mokheimer et al. |
| 2012/0167559 A1 | 7/2012 | Havel |
| 2012/0255309 A1 | 10/2012 | Venetos et al. |
| 2013/0047976 A1 | 2/2013 | Kaftori |
| 2013/0081394 A1 | 4/2013 | Perry |
| 2013/0118169 A1 | 5/2013 | Milam et al. |
| 2013/0175006 A1 | 7/2013 | Robinson et al. |
| 2014/0053554 A1 | 2/2014 | Tartibi et al. |
| 2014/0074314 A1 | 3/2014 | Niknafs et al. |
| 2014/0102073 A1 | 4/2014 | Pang et al. |

(56) References Cited

U.S. PATENT DOCUMENTS

| | | |
|---|---|---|
| 2014/0190469 A1 | 7/2014 | O'Donnell et al. |
| 2014/0216717 A1 | 8/2014 | O'Donnell et al. |
| 2014/0223906 A1 | 8/2014 | Gee et al. |
| 2014/0224469 A1 | 8/2014 | Mirmobin et al. |
| 2014/0366536 A1 | 12/2014 | Muren |
| 2015/0033740 A1 | 2/2015 | Anderson et al. |
| 2015/0053266 A1 | 2/2015 | Chen et al. |
| 2015/0143806 A1 | 5/2015 | Friesth |
| 2015/0224850 A1 | 8/2015 | Bank et al. |
| 2015/0276234 A1 | 10/2015 | Muro et al. |
| 2015/0354545 A1 | 12/2015 | Conlon |
| 2016/0130709 A1 | 5/2016 | Hong et al. |
| 2016/0146110 A1 | 5/2016 | Hackstein et al. |
| 2016/0164451 A1 | 6/2016 | Lenert et al. |
| 2016/0208657 A1 | 7/2016 | Brückner et al. |
| 2016/0214910 A1 | 7/2016 | King |
| 2017/0051949 A1 | 2/2017 | Uselton |
| 2017/0093163 A1 | 3/2017 | Johnson et al. |
| 2017/0204741 A1 | 7/2017 | Hogen et al. |
| 2017/0241669 A1 | 8/2017 | von Behrens |
| 2017/0283713 A1 | 10/2017 | Stephens et al. |
| 2017/0362090 A1 | 12/2017 | Melsert et al. |
| 2018/0003445 A1 | 1/2018 | Bergan et al. |
| 2018/0028967 A1 | 2/2018 | Balfe et al. |
| 2018/0038352 A1 | 2/2018 | Conlon |
| 2018/0073777 A1 | 3/2018 | O'Donnell et al. |
| 2018/0083449 A1 | 3/2018 | Green |
| 2018/0163574 A1 | 6/2018 | Bailey et al. |
| 2018/0179955 A1 | 6/2018 | Apte et al. |
| 2018/0207557 A1 | 7/2018 | Nellis |
| 2018/0216010 A1 | 8/2018 | Hong |
| 2018/0231316 A1 | 8/2018 | Watremetz et al. |
| 2018/0245485 A1 | 8/2018 | Conlon |
| 2018/0292097 A1 | 10/2018 | Specter |
| 2018/0347406 A1 | 12/2018 | Friesth |
| 2018/0372420 A1 | 12/2018 | Ahadi et al. |
| 2019/0003308 A1 | 1/2019 | Laughlin |
| 2019/0043624 A1 | 2/2019 | Fork et al. |
| 2019/0045617 A1 | 2/2019 | Fork et al. |
| 2019/0162482 A1 | 5/2019 | Kerth |
| 2019/0226462 A1 | 7/2019 | Conlon |
| 2019/0331098 A1 | 10/2019 | von Behrens et al. |
| 2019/0359894 A1 | 11/2019 | Heidel et al. |
| 2020/0172815 A1 | 6/2020 | Stephens et al. |
| 2020/0232345 A1 | 7/2020 | Zwinkels |
| 2020/0332201 A1 | 10/2020 | Koseoglu et al. |
| 2020/0346165 A1 | 11/2020 | Lu et al. |
| 2020/0386447 A1 | 12/2020 | Wang |
| 2021/0094834 A1 | 4/2021 | Chen et al. |
| 2021/0143446 A1 | 5/2021 | Ponec et al. |
| 2021/0172685 A1 | 6/2021 | Bergan et al. |
| 2021/0190044 A1 | 6/2021 | Anderson et al. |
| 2021/0207527 A1 | 7/2021 | Robinson |
| 2021/0328544 A1 | 10/2021 | Johnson et al. |
| 2022/0049615 A1 | 2/2022 | Truong |
| 2022/0060142 A1 | 2/2022 | Akhavan-Tafti |
| 2022/0085603 A1 | 3/2022 | McNamara et al. |
| 2022/0090827 A1 | 3/2022 | Magaldi et al. |
| 2022/0132633 A1 | 4/2022 | Forsberg et al. |
| 2022/0146205 A1 | 5/2022 | Eronen et al. |
| 2022/0228271 A1 | 7/2022 | Ashok et al. |
| 2022/0228772 A1 | 7/2022 | Murata et al. |

FOREIGN PATENT DOCUMENTS

| | | | |
|---|---|---|---|
| CN | 1559893 A | 1/2005 | |
| CN | 101592439 B | 4/2011 | |
| CN | 105605957 A | 5/2016 | |
| CN | 105948037 A | 9/2016 | |
| CN | 107246732 A | 10/2017 | |
| CN | 107872196 A | 4/2018 | |
| CN | 108204760 A | 6/2018 | |
| CN | 108362151 A | 8/2018 | |
| CN | 108612634 A | 10/2018 | |
| CN | 111256364 A | 6/2020 | |
| CN | 210802160 U | 6/2020 | |
| CN | 111655989 A | 9/2020 | |
| CN | 212157096 U | 12/2020 | |
| DE | 19808810 C1 | 6/1999 | |
| DE | 102009020531 B3 | 4/2011 | |
| DE | 102017212684 A1 | 1/2019 | |
| EP | 794161 B1 | 7/1996 | |
| EP | 1930587 A2 | 6/2008 | |
| EP | 2372116 A1 | 10/2011 | |
| EP | 2722496 A2 | 4/2014 | |
| EP | 3081770 A1 | 10/2016 | |
| EP | 3324018 A1 * | 5/2018 | ............ C01F 11/04 |
| EP | 3486594 A1 | 5/2019 | |
| EP | 2837086 B1 | 11/2019 | |
| EP | 3245388 B1 | 11/2019 | |
| EP | 3725917 A1 | 10/2020 | |
| EP | 2909547 B1 | 9/2021 | |
| EP | 3642296 A1 | 1/2022 | |
| GB | 2109026 A | 5/1983 | |
| GB | 2477801 A | 8/2011 | |
| IL | 284451 | 8/2021 | |
| JP | 2006145200 A | 6/2006 | |
| KR | 2001-0100320 A | 11/2001 | |
| KR | 102308531 B1 | 10/2021 | |
| MA | 40029 A | 12/2015 | |
| TW | 202100240 A | 1/2021 | |
| WO | WO 1980/000170 | 2/1980 | |
| WO | WO 2007/108014 A1 | 9/2007 | |
| WO | WO 2008/052249 A1 | 5/2008 | |
| WO | WO 2008/108870 A1 | 9/2008 | |
| WO | WO 2009/152562 A1 | 12/2009 | |
| WO | WO 2011/077248 A2 | 6/2011 | |
| WO | WO 2011/109514 A1 | 9/2011 | |
| WO | WO 2012/123853 A1 | 9/2012 | |
| WO | WO 2012/127178 A1 | 9/2012 | |
| WO | WO 2012/150969 A1 | 11/2012 | |
| WO | WO 2013/020176 A1 | 2/2013 | |
| WO | WO 2014/063191 A1 | 5/2014 | |
| WO | WO 2014/151843 A2 | 9/2014 | |
| WO | WO 2015/149124 A1 | 10/2015 | |
| WO | WO 2015/187423 A2 | 12/2015 | |
| WO | WO 2016/065191 A1 | 4/2016 | |
| WO | WO 2016/150455 A1 | 9/2016 | |
| WO | WO 2017/049320 A1 | 3/2017 | |
| WO | WO 2017/147022 A1 | 8/2017 | |
| WO | WO 2018/011363 A1 | 1/2018 | |
| WO | WO 2018/101989 A1 | 6/2018 | |
| WO | WO 2019/020562 A1 | 1/2019 | |
| WO | WO 2019/149623 A1 | 8/2019 | |
| WO | WO 2019/224538 A1 | 11/2019 | |
| WO | WO 2020/068758 A1 | 4/2020 | |
| WO | WO 2020/254001 A1 | 12/2020 | |
| WO | WO 2022/086630 A1 | 4/2022 | |
| WO | 2022/187903 A1 | 9/2022 | |
| ZA | 201603514 B | 11/2018 | |

OTHER PUBLICATIONS

"Matching Time Of Use Periods With Grid Conditions Maximizes Use Of Renewable Resources", California ISO, Cutcropping Way, Folsom, 2015, Total pp. 2.

"Miscibility Gap Alloys", University of Newcastle, accessed at https://miscibilitygapalloy.blogspot.com/p/how-did-it-stater-ted.html on Apr. 2, 2022.

Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.

Alexis McKittrick, "Low Temperature & Coproduced Resources Reservoir Thermal Energy Storage (RTES) Portfolio", Geothermal Technologies Office, U.S. Department of Energy, Total pp. 4.

Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.

Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.

(56) References Cited

OTHER PUBLICATIONS

Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.

Bao Truong, "Malta Pumped Heat Energy Storage System Green Heat & Power Application", Energy Storage for Manufacturing and Industrial Decarbonization Workshop, Feb. 9, 2022, Total pp. 5.

Ben Bollinger, "Malta Pumped Heat Energy Storage", Malta, Aug. 10, 2021, Total pp. 9.

Cédric Philibert, "Renewable Energy for Industry", Renewable Energy Division, International Energy Agency, Nordic Pavillion, COP23, Fidji—Bonn, Nov. 15, 2017, Total pp. 7.

Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.

Charles Forsberg et al., "Variable Electricity from Base-load Nuclear Power Plants Using Stored Heat", International Congress on Advances in Nuclear Power Plants (ICAPP 2015), May 2015, Total pp. 12.

Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.

Charles Forsberg, "Hybrid systems to address seasonal mismatches between electricity production and demand in nuclear renewable electrical grids", Energy Policy, vol. 62, Nov. 2013, pp. 333-341, Total pp. 9.

Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.

Christopher Fraughton, "Electro-Thermal Energy Storage General Presentation", MAN Energy Solutions, Aug. 2021, Total pp. 23.

CK-12 Foundation, "Saturated Hydrocarbon", Apr. 2, 2022, Total pp. 8.

Clifford K. Ho, "High-Temperature Thermal Storage in Moving and Fixed Particle Beds", Thermal-Mechanical-Chemical Energy Storage (TMCES) Workshop, San Antonio, TX, Total pp. 13.

Cowper Stove An overview, ScienceDirect Topics, Sep. 13, 2021, Total pp. 25.

D. Fernandes et al., "Thermal energy storage: How previous findings determine current research priorities", Energy, vol. 39, Issue 1, Mar. 2012, pp. 246-257, Total pp. 12.

Daniel C Stack et al., "Performance of firebrick resistance-heated energy storage for industrial heat applications and round-trip electricity storage", Applied Energy, vol. 242, May 15, 2019, pp. 782-796, Total pp. 15.

Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.

Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.

Daniel Stack et al., "Joule Hive-Replacing fire with renewable heat", Total pp. 15.

David Bierman, "Clean, affordable, and reliable heat & electricity", Antora Energy, Total pp. 9.

David L.Chandler "MIT News: Turning desalination waste into a useful resource" MIT News Office, Feb. 13, 2019 (Cited in NFOA dated Sep. 14, 2022 in related U.S. Appl. No. 17/650,522.).

David Roberts, "Solar power's greatest challenge was discovered 10 years ago. It looks like a duck", www.vox.com, Aug. 29, 2018, Total pp. 19.

Dr. Avi Shultz, "Concentrating Solar-thermal Power and Thermal Energy Storage", U.S. Department of Energy, Total pp. 7.

Dr. Avi Shultz, "Industrial DecarbonizatiomRenewable Process Heating from Concentrating Solar Thermal", U.S. Department of Energy, Total pp. 6.

Dr. Eric L. Miller, "The Hydrogen Energy Earthshot and H2@Scale: Importance to Industrial Decarbonization", Energy StorM Panel, Feb. 8, 2022, Total pp. 9.

Dr. Gianluca Ambrosetti et al., "Cement Production", Energy Storage for Manufacturing and Industrial Decarbonization Workshop "Energy StorM", Feb. 8, 2022, Total pp. 10.

Echogen, "CO2-Based Pumped-Thermal Energy Storage Technical Overview & Status", Echogen Power System, Total pp. 20.

Elizabeth Endler, "Energy Storage for Manufacturing Petrochemical Industry Perspective", Feb. 8, 2022, "Energy StorM" Workshop, US Department of Energy, Total pp. 14.

Elliott Group, "Materials for Hydrogen Compression", Thermo-Mechanical-Chemical Energy Storage Workshop, Elliott, Aug. 10-11, 2021, Total pp. 25.

Emiliano Bellini, "Long-duration thermal storage system based on silica sand", pv magazine International, Nov. 5, 2021, Total pp. 6.

Emiliano Bellini, "Storing wind, solar power with silica sands", pv magazine International, Sep. 1, 2021, Total pp. 10.

Gregory C Staple, "California's Grid Geeks: Flattening the 'duck curve'", Jan. 25, 2017, www.greenbiz.com, Total Page Count 9.

Grid Energy Storage, U.S. Department of Energy, Dec. 2013, Total pp. 67.

Haisheng Chen et al., "Progress in electrical energy storage system: A critical review", Progress in Natural Science, vol. 19, Issue 3, Mar. 10, 2009, pp. 291-312, Total pp. 22.

Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.

Hélder Da Silva, "Energy Storage for Manufacturing and Industrial Decarbonization Workshop "Energy StorM"", Feb. 8, 2022, Total pp. 11.

Hitesh Bindra et al., "Sliding flow method for exergetically efficient packed bed thermal storage", Applied Thermal Engineering, vol. 64, Issues 1-2, Mar. 2014, pp. 201-208, Total pp. 8.

Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.

Ilievski D, "New Two-Stage Calcination Technology", Proceedings of the 9th International Alumina Quality Workshop, Alcoa World Alumina, Technology Delivery Group, Western Australia, 2012, Total pp. 7.

Industrial Decarbonization using Electric Thermal Energy Storage (ETES), Jan. 25, 2022, Total pp. 11.

International Search Report dated Sep. 14, 2022 for International Application No. PCT/US2021/061041, 41 pages.

Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.

Jay Fitzgerald, "Bioenergy and Chemical Energy Storage", Energy Storage for Manufacturing & Industrial Decarbonization Workshop, Feb. 8-9, 2022, Total pp. 6.

Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.

Jeff Moore, "Oxygen Storage Incorporated into the Allam OxyFuel Power Cycle", Southwest Research Institute, Total pp. 8.

Joe Cresko, "Energy Storage for Manufacturing", Energy Storage for Manufacturing & Industrial Decarbonization Workshop, Feb. 8-9, 2022, Total pp. 11.

Joe Paladino, "Transformation of the Electric Grid", Energy StorM Workshop, Feb. 4, 2022, Total pp. 5.

Joe Stekli, "LCRI Update TMCES 2021", Low-Carbon Resources Initiative, Electric Power Research Institute, Aug. 2021, Total pp. 31.

Joshua Schmitt, "Development of An Advanced Hydrogen Energy Storage System Using Aerogel In A Cryogenic Flux Capacitor (Cfc)", Southwest Research Institute, Total pp. 8.

(56) References Cited

OTHER PUBLICATIONS

Lion Hirth, "The market value of variable renewables: The effect of solar wind power variability on their relative price", Energy Economics, vol. 38, Jul. 2013, pp. 218-236, Total pp. 19.

Lion Hirth, "The Optimal Share of Variable Renewables: How the Variability of Wind and Solar Power affects their Welfare-optimal Deployment", The Energy Journal, vol. 36, No. 1, pp. 149-184, Total pp. 36.

Lori Schaefer-Weaton, "Solar & Battery Energy Solution Agri-Industrial Plastics Co.", Agri-Industrial Plastics Company, Total pp. 12.

Luisa F Cabeza, "Advances in Thermal Energy Storage Systems Methods and Applications", Woodhead Publishing Series in Energy, No. 66, 2015, Total pp. 592.

M Gajendiran et al., "Application of Solar Thermal Energy Storage for Industrial Process Heating", Advanced Materials Research, vols. 984-985, Jul. 2019, Total pp. 7.

Marc Medrano et al., "State of the art on high-temperature thermal energy storage for power generation. Part 2—Case studies", Renewable and Sustainable Energy Reviews, vol. 14, Issue 1, Jan. 2010, pp. 56-72, Total 17.

Mathieu Hubert, "Lecture 3:Basics of industrial glass melting furnaces", IMI-NFG Course in Processing of Glass, Spring 2015, Total pp. 75.

Michael Pesin, "The Office of Electricity Grid Modernization R&D Portfolio", Aug. 2, 2021, Total pp. 18.

Mike Gravely, "The Role of Energy Storage in Helping California Meet the State's Future Zero Carbon Energy Goals", Energy Research and Development Division, California, Total pp. 23.

Natalie Smith et al., "Integration of Pumped Heat Energy Storage with a Fossil-Fired Power Plant", U.S. Department of Energy, Total pp. 6.

PCT; Invitation to Pay Additional Fees issued in International Patent Application No. PCT/US2021/061041; dated Mar. 24, 2022; 21 Pages.

Pintail Power LLC, "Liquid Air Combined Cycle Hybrid Energy Storage", Pintail Power LLC, TMCES Workshop, Aug. 10-11, 2021, San Antonio, TX, Total pp. 12.

Office Action in U.S. Appl. No. 17/650,519 dated Apr. 20, 2022, 10 pages.

R. B. Laughlin, "Variable Blading in Closed-Cycle Brayton Energy Storage", TMCES, Aug. 10, 2021, San Antonio, Total pp. 26.

Rainer Kurz, "Hydrogen Pipelines & Storage", Mar. 8, 2021, Total pp. 16.

Revterra, "Revterra Company Overview", TMCES 2021, Total pp. 14.

Reyad Sawafta, "Thermal Energy Storage—Cold Storage", Energy Storage for Manufacturing and Industrial Decarbonization Workshop, Feb. 9, 2022, Total pp. 11.

Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.

Richard T. Ibekwe, "Induction Heating of Firebricks for the Large-Scale Storage of Nuclear and Renewable Energy", Massachusetts Institute of Technology, Jun. 2018, Total pp. 40.

Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.

Russ Weed, "Market Needs & Technology Overview", Thermal-Mechanical-Chemical Energy Storage Workshop—Storage Deployment, Aug. 11, 2021, Total pp. 20.

S. W. Sucech et al., "Alcoa Pressure Calcination Process for Alumina", Light Metals 1986, R.E. Miller, 669-674, Total pp. 6.

Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.

Scott Hume, "Mid-Duration Energy Storage (MDES) Benefits and Challenges", 3rd TMCES Workshop, 10 Aug. 10, 2021, Total pp. 11.

Sempra Energy Utility, "SoCalGas", Total pp. 6.

Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.

Siemens AG, "Compressed Air Energy Storage (CAES)", 3rd Thermal-Mechanical-Chemical Energy Storage Workshop, Siemens Energy, Aug. 2021, Total pp. 17.

Siemens Gamesa, "Electric Thermal Energy Storage (ETES)—Industrial Decarbonization", Siemens Gamesa Renewable Energy, Total pp. 9.

Soteris Kalogirou, "The potential of solar industrial process heat applications", Applied Energy, vol. 76, Issue 4, Dec. 2003, pp. 337-361, Total pp. 25.

Steffes, ThermElect Hydronic, Demand-Free, Off-Peak Heating, Total pp. 2.

Stefica Nicol Bikes, "Australian engineers patent thermal block to store renewable energy", www.reuters.com, Oct. 27, 2021, Total pp. 6.

Storworks Power, 3rd Thermal-Mechanical-Chemical Energy Storage Workshop, Aug. 10, 2021, Total pp. 8.

Swagelok Energy Advisors Inc, "Steam Quality—Plant Operations Require A High Steam Quality", Steam Systems Best Practices, Document No. 23, 2009, Total pp. 3.

T. Fiedler et al., "Thermal capacitors made from Miscibility Gap Alloys (MGAs)", WIT Transactions on Ecology and The Environment, vol. 186, 2014, Total pp. 8.

Thomas A. Buscheck, "Hybrid-energy technology enabled by heat storage and oxy-combustion for power and industrial-heat applications with near-zero or negative $CO_2$ emissions", Thermal-Mechanical-Chemical Energy Storage Workshop, San Antonio, Texas, Total pp. 22.

Timothy C. Allison, "Thermal-Mechanical-Chemical Energy Storage Technology Overview and Research Activities", Southwest Research Institute, Aug. 9, 2021, Total pp. 22.

Todd Brix, "Converting Carbon. Storing Energy", Richland, Washington U.S.A, Total pp. 13.

Tony Bowdery et al., "Heat Exchangers For Thermal Energy Storage: Challenges And Mitigation", Meggitt, Aug. 2021, Total pp. 20.

Torbjörn Lindquist, "Powering the evolution of a renewable society, by redefining energy infrastructure", Azelio, Total pp. 10.

Travis McLing et al., "Dynamic Earth Energy Storage: Grid Scale Energy Storage using Planet Earth as a Thermal Battery (RTES)", Total pp. 7.

Trevor Brown, "Ammonia: the other hydrogen", Energy Storage for Manufacturing and Industrial Decarbonization Workshop "Energy StorM", Feb. 9, 2022, Total pp. 13.

Veera Gnaneswar Gude, "Energy storage for desalination processes powered by renewable energy and waste heat sources", Applied Energy, vol. 137, Jan. 1, 2015, pp. 877-898, Total pp. 22.

Vishal Sardeshpande, "Performance analysis for glass furnace regenerator", Applied Energy, vol. 88, Issue 12, Dec. 2011, pp. 4451-4458, Total pp. 8.

Whitlock, "NREL scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.

Written Opinion of the International Searching Authority dated Sep. 14, 2022 for PCT/US2021/061041, 25 pages.

Dr. Jeffrey Goldmeer, "Power To Gas: Hydrogen for Power Generation Fuel Flexible Gas Turbines as Enablers for a Low or Reduced Carbon Energy Ecosystem," GE Power, Feb. 2019, 19 pages.

GE Energy Storage Unit RSU-4000, Modular, Scalable Energy Storage Solution for Utility-Scale Applications; www/ge.com/energystorage; 2020, 1 page.

Hamish Andrew Miller, et al. "Green hydrogen from anion exchange membrane water electrolysis: a review of recent developments in

(56) References Cited

OTHER PUBLICATIONS critical materials and operating conditions," rsc.li/sustainable-energy; DOI: 10.1039/ c9se01240k; Received Dec. 14, 2019; Accepted Mar. 4, 2020; 20 pages.

How thermal power plants can benefit from the energy transition, The Future of Energy 2019, Siemens Gamesa Renewable Energy, 10 pages.

Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.

\* cited by examiner

ENERGY STORAGE SYSTEM AND ALUMINA CALCINATION APPLICATIONS

CROSS-REFERENCE TO RELATED APPLICATIONS

The present application is a continuation-in-part of U.S. patent application Ser. No. 18/171,602, filed Feb. 20, 2023, which is a divisional of U.S. patent application Ser. No. 17/650,522, filed Feb. 9, 2022[1]. This application also claims priority under 35 USC § 120 to Ser. No. 18/142,564, filed on May 2, 2023, which is a continuation-in-part of U.S. patent application Ser. No. 17/668,333, filed Feb. 9, 2022. This application also claims priority under 35 USC § 119(e) to:
U.S. Provisional Patent Application No. 63/459,540 filed on Apr. 14, 2023,
U.S. Provisional Patent Application No. 63/338,805 filed on May 5, 2022,
U.S. Provisional Patent Application No. 63/347,987 filed on Jun. 1, 2022,
U.S. Provisional Patent Application No. 63/378,355 filed on Oct. 4, 2022,
U.S. Provisional Patent Application No. 63/427,374 filed on Nov. 22, 2022, and
U.S. Provisional Patent Application No. 63/434,919 filed on Dec. 22, 2022.

[1] ... which is a continuation of PCT/US21/61041 under 35 USC § 120 and U.S. Pat. No. 11,603,776 under 35 USC § 120, granted on Mar. 14, 2023 and filed Nov. 29, 2021, which claims benefit under 35 USC § 119(e) to U.S. Provisional Application No. 63/119,443, filed on Nov. 30, 2020, U.S. Provisional Application No. 63/155,261, filed on Mar. 1, 2021, U.S. Provisional Application No. 63/165,632, filed on Mar. 24, 2021, U.S. Provisional Application No. 63/170,370, filed on Apr. 2, 2021, and U.S. Provisional Application No. 63/231,155, filed on Aug. 9, 2021, as well as under 35 USC § 120 and 35 USC 365 to PCT/US2021/06141, filed Nov. 29, 2021.

The contents of these priority applications are incorporated by reference in their entirety and for all purposes.

BACKGROUND

Technical Field

The present disclosure relates to thermal energy storage and utilization systems. More particularly, the present disclosure relates to an energy storage system that stores electrical energy in the form of thermal energy, which can be used for the continuous supply of hot air, carbon dioxide ($CO_2$), steam or other heated fluids, for various applications including the supply of heat for power generation. More specifically, the energy storage system provides higher-temperature heat to an alumina calcination process in which a solid chemical compound is heated to a controlled, high temperature in a controlled environment in the presence of little to no oxygen to remove impurities or volatile substances and/or to incur thermal decomposition to a desired product. As used throughout this disclosure, the terms calcination and activation may refer to dehydroxylation as well as other chemical changes driven by heat, including decomposition of calcium carbonate to calcium oxide and aluminum hydroxide to aluminum oxide.

Related Art
I. Thermal Energy Systems
A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, boiling, or thermally driven decomposition or deterioration, including chemical and mechanical effects.

Further, different uses of thermal energy—different heating processes or industrial processes—require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into storage media, and then transferred at another time from storage media to an outlet. The rate of heat transfer into and out of storage media is limited by factors including the heat conductivity and capacity of the media, the surface area across which heat is transferring, and the temperature difference across that surface area. High rates of charging are enabled by high temperature differences between the heat source and the storage medium, high surface areas, and storage media with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or conductive cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its full capacity, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important, and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the bricks closest to the heating wire are heated more than the bricks that are further away from the heating wire. As a result, the failure rate for the wire is likely to be increased, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion.

There is also a need to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Alumina Calcination Applications

A. Calcination Concepts and Methods

The term "calcination" broadly refers to a process in which a solid chemical compound is heated to a controlled, high temperature in a controlled environment in the presence of little to no oxygen to remove impurities and/or to incur thermal decomposition to a desired product. Calcination has traditionally referred to a process for decomposing limestone (or calcium carbonate) into quicklime (calcium oxide) and carbon dioxide. This reaction is widely used in industry given that limestone is an abundant mineral and that quicklime is used in the production of cement, mortar, plaster, paint, steel, paper and pulp as well as in the treatment of water and flue gases.

Other calcination processes include the dehydroxylation (i.e., removal of crystalline water) of gypsum used in producing building materials and other products, dehydroxylation of alumina used in producing aluminum metal and other products, and dehydroxylation of clay minerals, which may be used for the activation of clay for use as a supplementary cementitious material (SCM) in a cement mixture, such as alongside Portland cement. Clay mineral activation differs from its limestone counterpart in that the reaction releases water (—OH groups) instead of $CO_2$.

Different calcination reactions require different operating conditions (e.g., temperature, environment compositions, etc.) to expose minerals to heat and drive calcination. Over time, different designs have been developed, including shaft furnaces, rotary kilns, multiple hearth furnaces, and fluidized bed reactors. Many associated processes have also been developed including internal radiant heating via fuel combustion within a kiln or reactor, internal convective heating via hot gas flow within a kiln or reactor, or external heating of a kiln or reactor. These traditional modes are referred to as soak-calcination processes, given that the material takes several minutes to hours in the reaction chamber to become fully activated.

Flash calcination is another approach, which is more rapid than the soak process, and takes place in a reactor that uses gases at velocities and temperatures creating gas-particle interactions including entrainment and suspension, so as to drive effective heat transfer and encourage chemical reactions. Systems using this principle commonly introduce a gas that has been heated via combustion of a fuel (including direct exhausted combustion products) and/or a gas that may be heated from cooling the products of calcination (or recovered from other heat sources, at the bottom of a reaction chamber in an up-flow configuration). The gas temperature may commonly range from 600° C. to 1100° C. In one implementation, raw clay material to be processed is finely divided and is fed into a chamber above the hot gas injection point. Upward flowing hot gases interact with raw material and may suspend the raw material through the chamber where the particles are quickly heated by the flowing gases.

Additional sources of heat may be incorporated within (or without) the chamber, including fuel combustion devices or additional hot gas introduction ports, to maintain a desired temperature profile or ambient gas composition. As the material exits the chamber, it has been heated to the desired state of calcination (or activation). The gas composition within the chamber may be selected to perform a function of controlling the quality of the product. For example, oxygen may be excluded or there may be a reducing atmosphere zone for quality control of the product. The material to be processed may contain iron that will become oxidized in non-reducing environments and cause the product to change color which may not be desired. This atmosphere reduction zone may be enforced via injection of reducing gases or supplied via supplemental burners in which any oxygen in the air is reduced via injected fuel. After heating and calcination, the material is then rapidly cooled, often by air in cooling cyclones or another form of air quench. Water can also be used as a cooling fluid in certain processes. The product is cooled to a temperature below 100° C.

Some attempts have been made to analyze clay calcination in gas suspension heaters in order to determine the effect of operating conditions. In one example, a kaolinite particle feed was added above a burner and passed through the chamber with and without supplemental burners along the channel. Convection was the dominant form of heat transfer in the process where an ideal gas supply temperature was about 900° C., e.g., 900° C., without supplemental burners.

With respect to the calciner stage, art approaches perform alumina calcination in two stages: a first stage at a lower temperature associated with a decomposer and steam separation to perform partial calcination, and a second stage at a higher temperature than the first stage, but at a lower temperature than would be required if calcination was performed in a single stage. The first stage may be at a temperature such as 350° C., and the second stage may be in the range of 750° C. to 950° C. The two-stage calcination process provides energy efficiency advantages over a single stage calcination process. Similar to clay calcination, a fuel is provided as an input to the first calcination stage and the second calcination stage. The heat that is output from calcination may be provided for reading and waste heat recovery, with the remaining heat being expelled after water cooling via stack gas output.

In these approaches, internal electrical resistive heaters cannot cost-effectively directly replace a burner in the calciner, for two reasons. Heating the large gas volume needed for gas suspension purely via resistive heaters with known resistive heaters requires large space and cost. Additionally, known resistive heaters may experience degradation due to the particulate matter present in a calcination process interacting with and degrading the heater surfaces.

B. Conventional Heating Sources

A calciner is a high-temperature furnace that is used to heat materials to very high temperatures, typically above 800° C. The heating sources used in calciners can vary depending on the specific design and application. The choice of heating source for a calciner will depend on a number of factors, including the specific application, the size of the furnace, and the availability and cost of the heating source.

Natural gas is a commonly used fuel in calciners because it is readily available, efficient, and produces a high heat output. It is often used in combination with a forced-air burner, which blows hot air into the furnace to achieve the desired temperature. Similarly, propane is another commonly used fuel in calciners because it is also readily available and produces a high heat output. Like natural gas, it is often used in combination with a forced-air burner to achieve the desired temperature.

Fuel oil is another option for heating a calciner, although it is less commonly used than natural gas or propane. It is often used in combination with a combustion chamber that burns the fuel to produce hot gases that are then used to heat the furnace. Coal can be used as a heating source in a calciner, although it is less commonly used than natural gas or propane. It is often used in combination with a combustion chamber that burns the coal to produce hot gases that are then used to heat the furnace.

C. Conventional Calcination Processes—Problems and Disadvantages

Conventional calcination processes are used in various industries to bring about a chemical or physical change in a material by heating it to a high temperature. However, these processes have several problems and disadvantages. The first issue is the high energy consumption required for these processes, which can lead to high operating costs and environmental concerns. The second disadvantage is the time-consuming nature of calcination processes, especially for materials that require high temperatures for a prolonged period. This can limit production capacity and increase costs.

Conventional alumina calcination involves heating the cooled, wet gibbsite to 950° C.-1100° C. to remove free and crystalline moisture in the gibbsite, which is derived from bauxite. Art approaches have used a rotary kiln or calciner using heat from combustion. According to some art approaches, the material first enters a high-pressure calcination step (e.g., the decomposer), for example at 6-8 bar and 300° C.-480° C., and removes all the free moisture (e.g., drying) and activates a significant portion of the gibbsite to alumina. These mechanisms produce water vapor as effluent. The partially calcined material passes through a pressure reducer to the lower pressure calcination stage. This occurs at ambient pressure and relatively lower temperatures of 850° C.-950° C. Fuel and air that is preheated in the cooling of the product material is combusted in a gas suspension calciner. The heat from the flue gas is further recovered by being passed into a steam generator/superheater where is exchanges heat with recycled steam from the first stage, recycled steam from other steps in the Bayer process, or makeup water to supply the first calcination step (or decomposer) with superheated steam.

These approaches may have problems and disadvantages. For example, when steam is used as a heat transfer medium in calcination stage, it is necessary to account for the plant balance, as the high mass flow of superheated high-pressure steam must be filtered and cleaned before recirculating to other areas of the plant. The theoretically more favorable heat balance from collecting high temperature moisture from the decomposer also translates to a more complex, integrated process. The large mass flow leads to art problems in supplying the correct quantity of superheated steam. The steam generator/superheater is a major area for concern, both from the thermodynamic and operating standpoint. Additional fuel must be fired in this step. Additionally, buildup of contaminants or other degradation in process equipment is one of the largest issues in the concept, as the recirculated steam often must be cleaned and filtered of particulate matter before interacting with the steam generator and superheater.

Another problem with conventional calcination processes is the limited control over temperature and atmosphere inside the furnace, which can affect the final product quality. Additionally, during calcination, unwanted byproducts such as carbon dioxide and other gases can be formed, leading to environmental pollution and health hazards. Furthermore, conventional calcination processes may not be suitable for all types of materials, such as those that are sensitive to high temperatures or those that require a specific atmosphere during processing. Lastly, high-temperature calcination can cause significant wear and tear on furnace equipment, requiring frequent maintenance and repair. To overcome these disadvantages, alternative calcination processes such as microwave calcination, flash calcination, and sol-gel calcination have been developed. These processes offer advantages such as lower energy consumption, faster processing times, better control over temperature and atmosphere, and reduced formation of unwanted byproducts.

SUMMARY

The example implementations advance the art of thermal energy storage and enable the practical construction and operation of high-temperature thermal energy storage systems which are charged by VRE, store energy in solid media, and deliver high-temperature heat.

I. Thermal Energy Storage System

This Section I of the Summary relates to the disclosure as it appears in U.S. patent application Ser. No. 18/171,602, of which this application is a continuation-in-part.

Aspects of the example implementations relate to a system for thermal energy storage, including an input, (e.g., electricity from a variable renewable electricity (VRE) source), a container having sides, a roof and a lower platform, a plurality of vertically oriented thermal storage units (TSUs), inside the container, the TSUs each including a plurality of stacks of bricks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen and other gases, alone or in combination), and when one is mentioned it should be understood that the others can equally well be used. Thus, for example, "air" can be any suitable fluid or gas or combinations of fluids or gases.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, $CO_2$, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g. to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

II. Alumina Calcination Applications

This Section II of the Summary relates to the disclosure as it appears in U.S. Patent Application No. 63/338,805, of which this application is a continuation-in-part application.

The inventive system and process includes a calcination system having a thermal energy storage (TES) system that is configured to store thermal energy derived from a variable renewable energy source having intermittent availability. The TES system is configured to heat a storage medium using electricity from the renewable energy source, and deliver heat from the storage medium to a use by circulating a heated fluid. Further, a calciner is configured to receive and heat a material stream partially or fully with the heated fluid from the TES system to an activation temperature where impurities in the material stream are thermally decomposed to generate an activated product. More specifically, the calcination system is configured to apply the received thermal energy by injecting the material stream via a first inlet of the calciner, and injecting, via a second inlet of the calciner, the heated fluid from the TES system so as to suspend the injected material stream within the calciner.

The calcination system may include a pre-heater configured to pre-heat the material stream by transferring thermal energy from calciner reactor's hot exhaust fluid into the material stream, so as to remove moisture from the material stream and increase material temperature before the material stream enters the calciner. The calciner is configured to receive the pre-heated material stream and apply the received thermal energy to further heat the material stream to a higher temperature than the pre-heated material stream.

According to the calcination system, the TES working fluid, which in some embodiments may be a gaseous mixture consisting of carbon dioxide gas may be circulated from the calciner to the TES system as both the fluid to be heated by the TES system and the fluid to transfer heat to the material stream within the calciner, In other embodiments, the TES working fluid and fluid circulating through the calcination system (calcination working fluid) may be distinct streams such that a heat exchanger is utilized to transfer heat indirectly between the TES working fluid and calcination working fluid. A heat exchanger may be configured to receive thermal energy obtained from the calcination working fluid, and to apply the thermal energy from the calcination working fluid to heat the fluid that is input to the TES system. The fluid is a non-combustive fluid, and, for example, may be carbon dioxide, air, or a mixture of gases. The material stream input to the calciner includes aluminum hydroxide in mineral form, and the activated product generated by the calciner comprises alumina.

Additionally, a system may be configured where a TES system provides a first portion of heat to a calciner, and a fuel burner may be configured to provide the calciner with an additional second source of heat, which may be at the same or higher temperature, and wherein a fuel input to the fuel burner may be at least one of oxyfuel combustion and hydrogen. A heat exchanger may receive the burner exhaust and/or an output heated fluid from a cooling cyclone that cools the activated product generated by the calciner, and transfer the heat to a fluid stream that is provided as an input to the TES system. Further, an electric heater may be positioned between the TES system and the calciner injection point, and configured to raise the temperature of the fluid output by the TES system to a higher temperature. The electric heater may be powered by a thermal power turbine generator, whose input heat may be provided by any combination of fuel combustion, heat from the TES, and recovered heat from the integrated calcination/TES system. The TES system may provide heated fluid to the calciner in multiple forms and uses, including directly as heated fluid used within the calciner, or indirectly via a heat exchanger so as to generate steam for use in high-pressure steam partial calcination.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 8 to 13 include new disclosure of this continuation-in-part application.

FIG. 1 illustrates a schematic diagram of the thermal energy storage system architecture according to the example implementations.

FIG. 2 illustrates a schematic diagram of a system according to the example implementations.

FIG. 3 illustrates a schematic diagram of a storage-fired once-through steam generator (OTSG) according to the example implementations.

FIG. 4 illustrates an example view of a system being used as an integrated cogeneration system according to the example implementations.

FIG. 5 illustrates dynamic insulation according to the example implementations.

FIG. 6 provides an isometric view of the thermal storage unit with multiple vents closures open, according to some implementations.

FIG. 7 illustrates a two-staged alumina calcination process with an integrated thermal energy storage (TES) system according to an example implementation;

FIG. 9 illustrates a hydrocarbon fuel fired calciner process with an integrated thermal energy storage (TES) system according to an example implementation;

FIG. 10 illustrates an oxyfuel fired-calciner process with an integrated thermal energy storage (TES) system according to an example implementation;

FIG. 11 illustrates a calciner process with an integrated thermal energy storage (TES) system and optional electric booster according to an example implementation.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. patent Ser. No. 18/171,602, of which this application is a continuation-in-part.

U.S. patent Ser. No. 18/171,602 relates to the field of thermal energy storage and utilization systems, and addresses the above-noted problems. A thermal energy storage system is disclosed that stores electrical energy in the form of thermal energy in a charging mode, and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. patent Ser. No. 18/171,602

Figure 1:
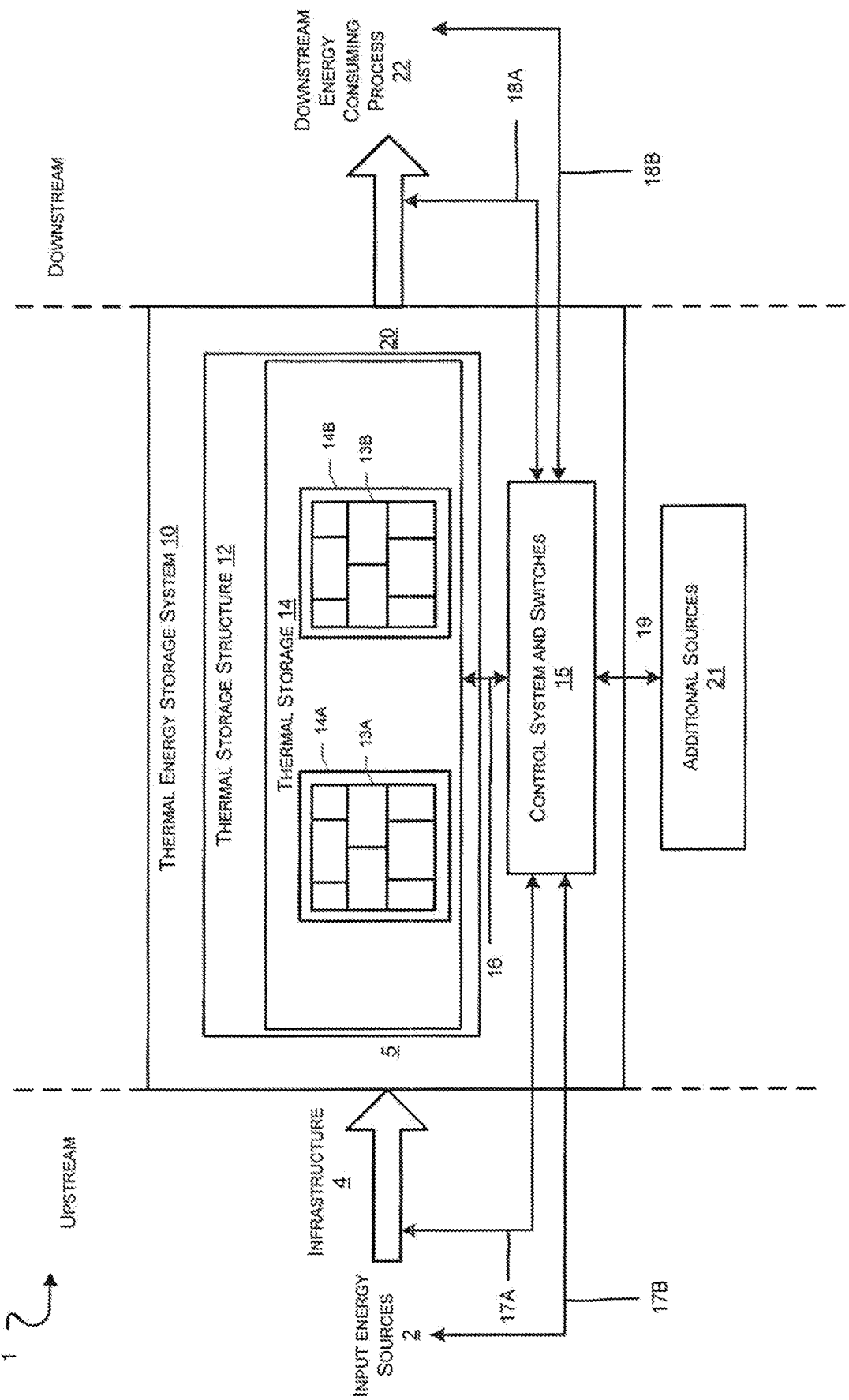
FIGS. 1 to 7 appear in parent U.S. patent application Ser. No. 18/171,602.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of solid storage media (e.g., 13A, 13B) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage media within the assemblages may variously be referred to as thermal storage blocks, bricks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter solid storage media, and absorbed and stored in solid media within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various embodiments.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19.

Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2, and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently storage energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
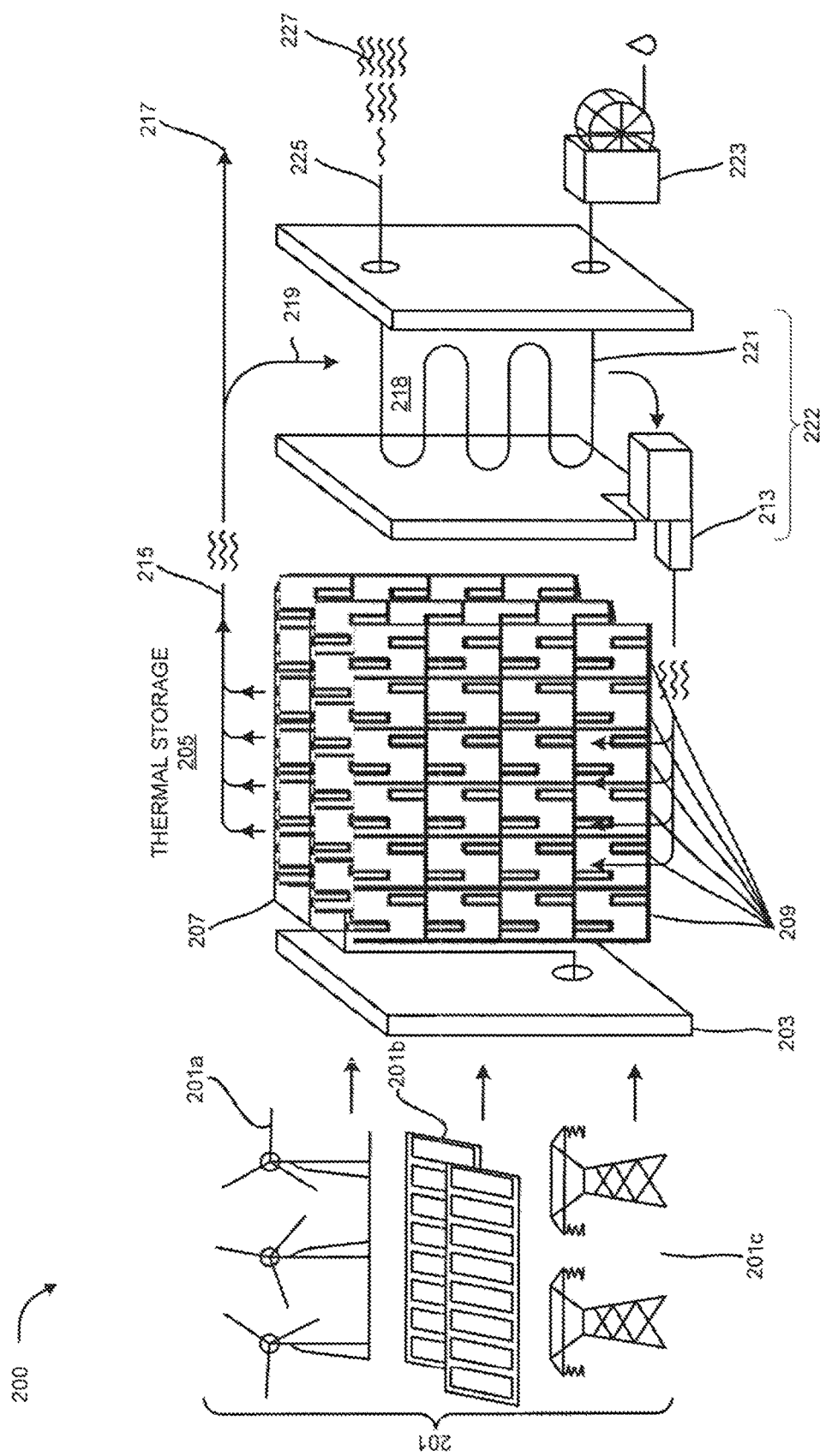

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201a, solar energy from photovoltaic cells 201b, or other energy sources may provide electricity that is variable in availability or price because the conditions for generating the electricity are varied. For example, in the case of wind turbine 201a, the strength, duration and variance of the wind, as well as other weather conditions causes the amount of energy that is produced to vary over time. Similarly, the amount of energy generated by photovoltaic cells 201b also varies over time, depending on factors such as time of day, length of day due to the time of year, level of cloud cover due to weather conditions, temperature, other ambient conditions, etc. Further, the input electricity may be received from the existing power grid 201c, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage media 209. Thermal storage components (sometimes called "bricks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented—one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by bricks in each of the arrays 209, with flow controlled by louvers. By the release of heat energy from the resistive heating elements 207, heat is radiatively transferred to arrays 209 of bricks during a charging mode. Relatively hotter brick surfaces reradiate absorbed energy (which may be referred to as a radiative "echo"), and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
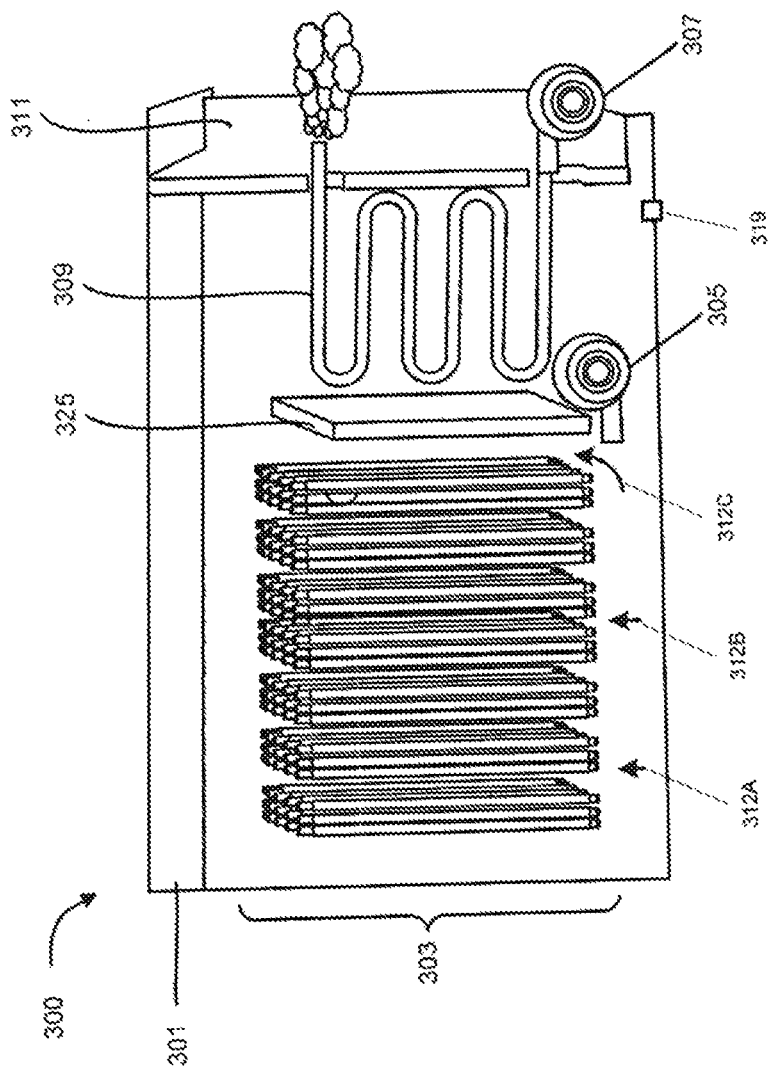

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319, and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water or another fluid pumped by the water pump 307. As the hot air heats up the water in the conduit, steam is generated at 311. The cooled air that has crossed the conduit (and transferred heat to the water flowing through it) is then fed back into the brick heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design infeasible.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
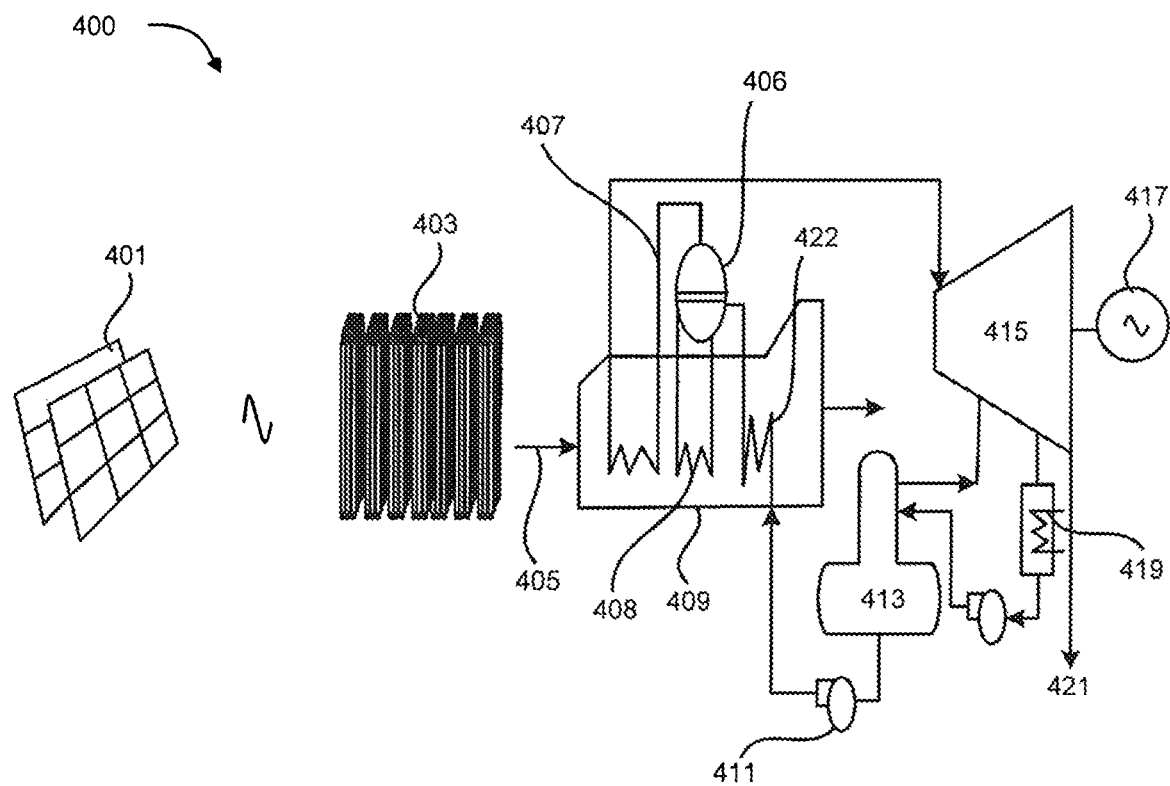
Figure 5:
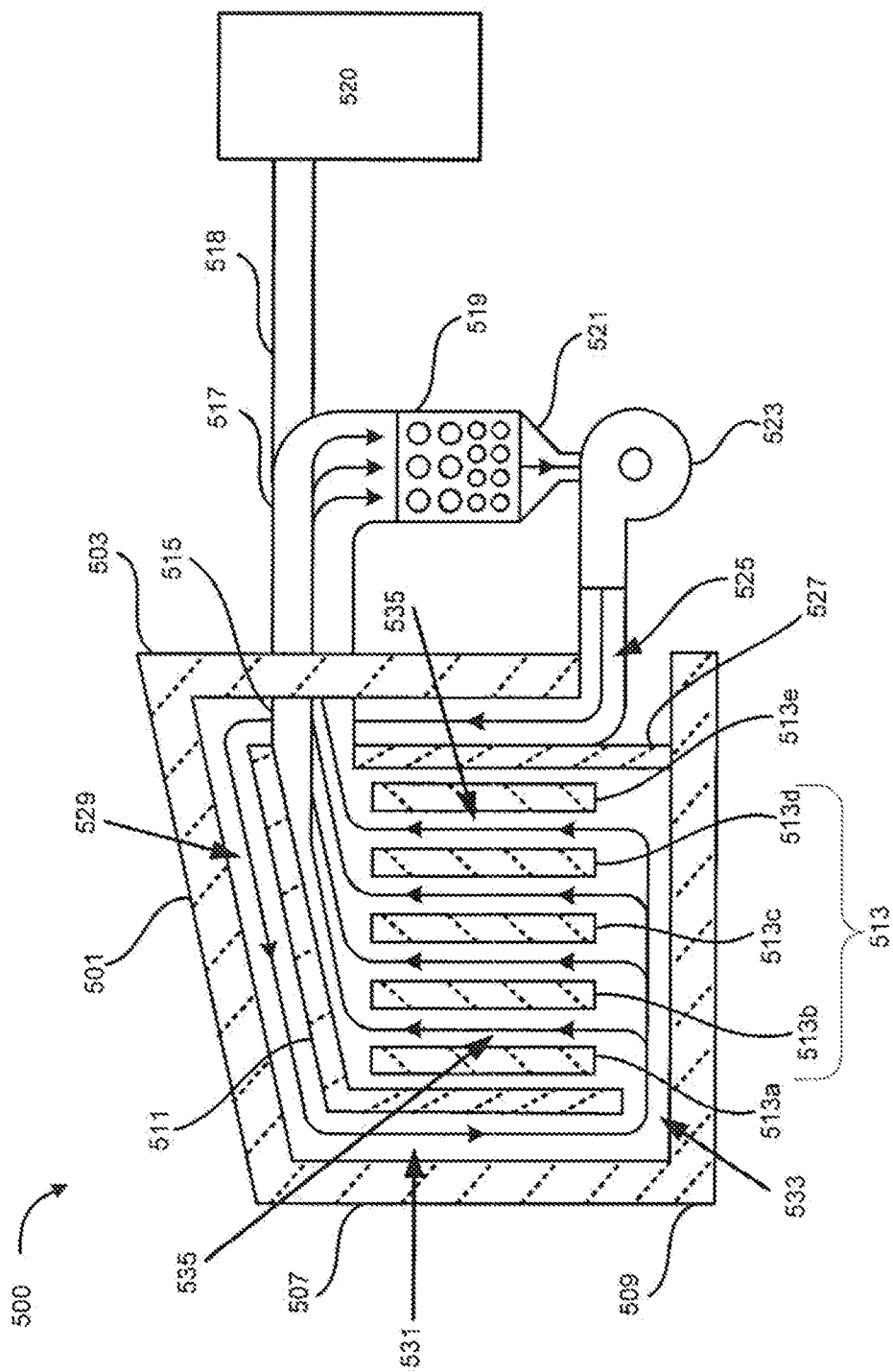

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 5, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process, or condensed at 419 and optionally passed through to a deaeration unit 413 and delivered to pump 411 in order to perform subsequent steam generation.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner; or an inverse temperature cascade may be employed. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g. 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g. 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure, or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
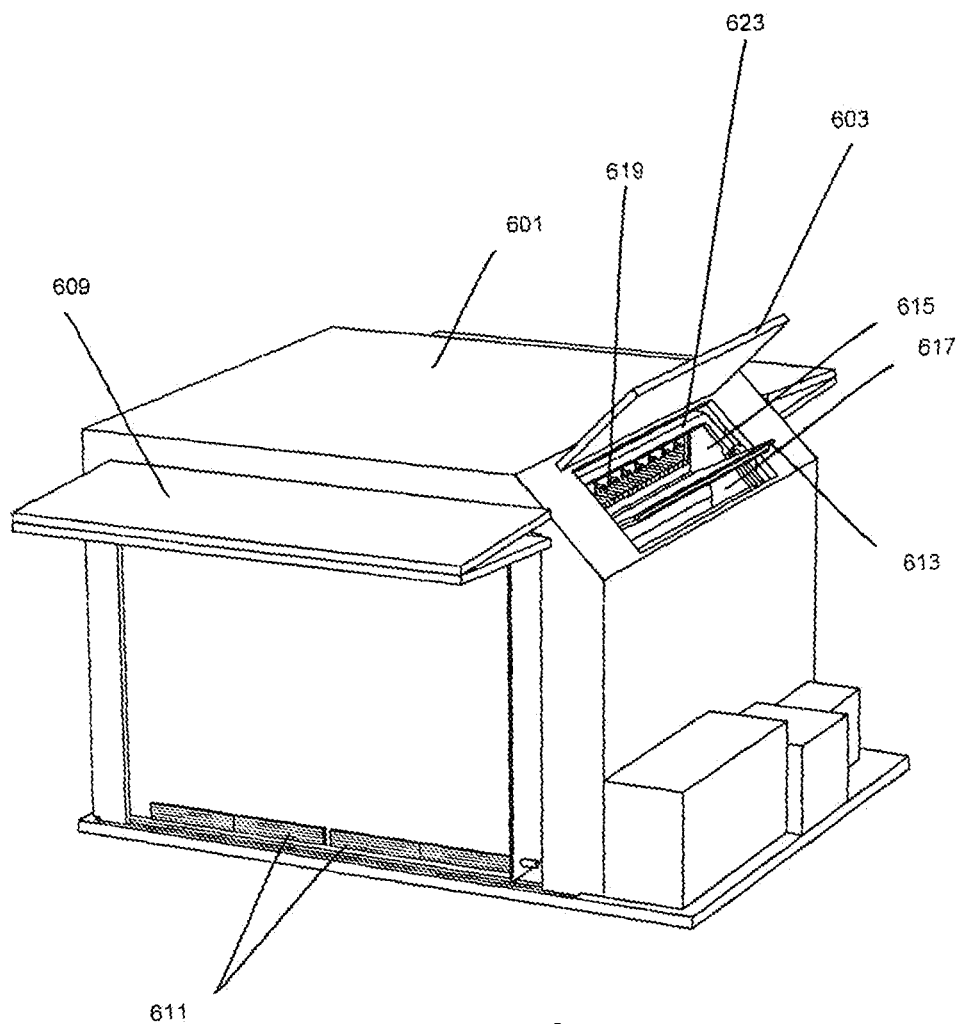

In an OTSG implementation, a first end of the conduit can be fluidically coupled to a water source. The system may provide for inflow of the fluids from the water source into a first end of the conduit, and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided further below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of bricks in the stack 513, the columns being represented as 513a, 513b, 513c, 513d and 513e. The heated fluid that is discharged from the upper portion of the columns of bricks 513a, 513b, 513c, 513d and 513e exits by way of an output 515, which is connected to a duct 517. The duct 517 provides the heated fluid as an input to a steam generator 519. Once the heated fluid has passed through the steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in the passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of bricks 513a, 513b, 513c, 513d and 513e and the air passages 535 are shown schematically in FIG. 5. The physical structure of the stacks and air flow passages therethrough in embodiments described herein is more complex, leading to advantages.

In some implementations, to reduce or minimize the total energy loss, the layer of insulation 511 is a high-temperature primary insulation that surrounds the columns 513a, 513b, 513c, 513d and 513e within the housing. Outer layers of lower-cost insulation may also be provided. The primary insulation may be made of thermally insulating materials selected from any combination of refractory bricks, alumina fiber, ceramic fiber, and fiberglass or any other material that might be apparent to a person of ordinary skill in the art. The amount of insulation required to achieve low losses may be large, given the high temperature differences between the storage media and the environment. To reduce energy losses and insulation costs, conduits are arranged to direct returning, cooler fluid from the HRSG along the outside of a primary insulation layer before it flows into the storage core for reheating.

The cooler plenum, including the passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the bricks 513a, 513b, 513c, 513d and 513e within the housing so that the bricks 513a, 513b, 513c, 513d and 513e are not in contact with the outer surface 501, 503, 507 of the housing, and are thus thermally isolated from the housing by the primary insulation formed by the layer of cool fluid. The bricks 513a, 513b, 513c, 513d and 513e may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the bricks, which restricts the dissipation of thermal energy being generated by the heating elements and/or stored by the bricks into the outside environment or the housing, and preheats the fluid. As a result, the controlled flow of cold fluid by the fluid blowing units of the system may facilitate controlled transfer of thermal energy from the bricks to the conduit, and also facilitates dynamic thermal insulation, thereby making the system efficient and economical.

In another example implementation, the buoyancy of fluid can enable an unassisted flow of the cold fluid around the bricks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible to by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat necessary to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in embodiments for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Bricks and Heating Elements

A. Problems Solved by One or More Disclosed Embodiments

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the bricks.

B. Example Solutions Disclosed Herein

In some implementations, thermal storage blocks (e.g., bricks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers, but are not directly open to the heating element. The stack of bricks may be used alone or in combination with other stacks of bricks to form the thermal storage unit, and one or more thermal storage units may be used together in the thermal energy storage system. As the fluid blower circulates the fluid through the structure during charge and discharge as explained above, a thermocline may be formed in a substantially vertical direction. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid media system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats brick material with high heater power loading, low and uniform exposed surface temperature, and long-distance heat transfer within the storage media array via multi-step thermal radiation.

Innovative structures according to the present disclosure may comprise an array of bricks that form chambers. The bricks have structured air passages, such that in the vertical direction air flows upwards in a succession of open chambers and small air passages. In some embodiments, the array of bricks with internal air passages is organized in a structure such that the outer surface of each brick within the TSU core forms a wall of a chamber in which it is exposed to radiation from other brick surfaces, as well as radiation originating from an electrical heater.

The chamber structure is created by alternating brick materials into a checkerboard-type pattern, in which each brick is surrounded on all sides by open chambers, and each open chamber has adjacent bricks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each brick within such a checkerboard structure is exposed to open chambers on all sides. Accordingly, during charging, radiant energy from multiple heating elements heats all outer surfaces of each brick, contributing to the rapid and even heating of the brick, and reducing reliance on conductive heat transfer within the brick by limiting the internal dimensions of the brick.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed brick surfaces are larger per unit of mass than in prior systems, meaning that incoming wattage per unit area is correspondingly smaller, and consequently thermal stresses due to brick internal temperature differences are lower. And critically, re-radiation of energy—radiation by hotter brick surfaces that is absorbed by cooler brick surfaces—reduces by orders of magnitude the variations in surface temperature, and consequently reduces thermal stresses in brick materials exposed to radiant heat. Thus, the radiation chamber design effectively enables heat to be delivered relatively uniformly to a large horizontally oriented surface area and enables high wattage per unit area of heater with relatively low wattage per unit area of brick.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in brick heat conductivity, or any cracks forming in a brick that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media, and localized peak heater temperatures, are reduced by a large factor compared to previous teachings.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the bricks from the bottom end of the cells to the upper end of the cells in the first section at the predefined flow rate, and then into the second section, such that the air passing through the bricks and/or heating elements of the cells at the predefined flow rate may be heated to a second predefined temperature, and may absorb and transfer the thermal energy emitted by the heating elements and/or stored by the bricks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit, to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of the inner enclosure 623 and the inner surface of the outer enclosure define a fluid passageway through which fluid may be conducted actively for dynamic cooling or passively for failsafe operation.

The inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, the vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to the duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g. wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e. with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may comprise an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g. during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g. brick) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the bricks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Embodiments implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 4, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an embodiment. Air temperature can be adjusted by recirculation/mixing, to provide inlet air temperature that does not vary with the state of charge of the bricks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various embodiments releases low-pressure steam that is condensed to a liquid by a condenser 419, and then de-aerated using a deaeration unit 413 and delivered to pump 411 in order to perform subsequent steam generation.

III. Calciner

1. Problems to be Solved

To address the problems and disadvantages of conventional calcination noted above, the thermal energy storage system described herein supplies heat to recirculating process steam, and may be integrated with heat recovery apparatuses to address art plant balance problems. For example, heat from the hot flue gases of the second gas suspension calciner may be utilized to supply a portion of the heat to either the thermal storage working fluid medium (e.g., gas-to-gas heat exchangers) or the process steam (e.g., gas to liquid heat exchanger). This will allow the plant greater flexibility in energy management as well as maintenance to fix solid buildup in heat transfer equipment. The thermal battery may be external to the plant and may either supply steam externally with an attached steam generator or supply steam indirectly, passing hot gases through existing or new heat exchangers replacing the duty of combustion gas products.

In another example implementation, the thermal storage relates to a fully integrated process where the thermal batteries replace all combustion on site. This implementation includes the above-described approach, with supplying all or the majority of the heat to the second calcination stage. The temperature of the partially calcined material is brought to near ambient pressure (from the high-pressure stage 1) and put in direct contact with hot flue gases, bringing the temperature to 850-950 C. This reduced temperature range allows the heat from fired fuels to be replaced by high temperature stored heat.

In some example implementations, the primary working fluid of the thermal energy storage system would contact the material to be calcined. In other example implementations, this heating may occur indirectly, where the primary working fluid of the thermal battery does not directly contact the material. The hot gas would be blown through the calciner at sufficiently high velocities to achieve desired level of suspension and activation. The gas effluent would leave the chamber at a high temperature to be used in the steam generation and superheating of the process steam used in the first stage of calcination as well as any other steam needs in the system.

2. Application of Calciner to Thermal Energy Storage System

In implementations that employ direct heat transfer, the fluid used as the heat transfer medium in the TES system is being supplied directly to the raw material in the calciner and then recirculated back to the TES system after coming into direct contact with the raw material. In implementations that employ indirect heat transfer, the fluid used in the TES system does not come into direct, physical contact with the material in the material heating system. Rather, in some implementations, the fluid in the TES system is used to transfer thermal energy via a heat exchanger into a secondary fluid that comes into contact the material. In other implementations, the fluid used in the TES system may indirectly heat the raw material without the presence of a secondary fluid by heating the walls of the calciner or kiln reactor system, with the heated walls transferring heat to the raw material on the other side of the wall via conduction and radiation. This "indirect" heating mode of thermal storage operation can also be used in applications other than calcination or kiln reactors, including but not limited to biomass drying or food processing. The secondary fluid may be in the liquid state in some implementations.

As noted above, the TES system may be used to provide heat into the calcination step of the Bayer alumina process. Additionally, the heat inputs into other parts of the process may also replace fuel, including the fuel that is provided at the mine, at the lime kiln, and at the steam generator that provides energy to operate these modules.

These approaches may have problems and disadvantages. For example, when steam is used as a heat transfer medium in calcination stage, it is necessary to account for the plant balance, as the extremely high mass flow of superheated high-pressure steam must be filtered and cleaned before recirculating to other areas of the plant. The theoretically more favorable heat balance from collecting high temperature moisture from the decomposer also translates to a more complex, integrated process. The large mass flow leads to art problems in supplying the correct quantity of superheated steam. The steam generator/superheater is a major area for concern, both from the thermodynamic and operating standpoint. Additional fuel must be fired in this step. Additionally, buildup in process equipment is one of the largest issues in the concept, as the recirculated steam often must be cleaned and filtered of particulate matter before interacting with the steam generator and superheater.

To address these problems and disadvantages, the thermal energy storage system described above supplies heat to recirculating process steam, and may be integrated with heat recovery apparatuses to address art plant balance problems. For example, heat from the hot flue gases of the second gas suspension calciner may be utilized to supply a portion of the heat to either the thermal storage working fluid medium (e.g., gas-to-gas heat exchangers) or the process steam (e.g., gas to liquid heat exchanger). This will allow the plant greater flexibility in energy management as well as maintenance to fix solid buildup in heat transfer equipment. The thermal battery may be external to the plant and may either supply steam externally with an attached steam generator or supply steam indirectly, passing hot gases through existing or new heat exchangers replacing the duty of combustion gas products.

In another example implementation, the thermal storage relates to a fully integrated process where the thermal batteries replace all combustion on site. This implementation includes the above-described approach, with supplying all or the majority of the heat to the second calcination stage. The temperature of the partially calcined material is brought to near ambient pressure (from the high-pressure stage 1) and put in direct contact with hot flue gases bringing the temperature to 850-950 C. This reduced temperature range allows the heat from fired fuels to be replaced by high temperature stored heat.

The two-stage pressure calcination stage of the Bayer process is one known process. More commonly, the calcination stage consists of one stage (which is essentially identical to the second 'low-pressure' stage of the aforementioned two-stage process) where wet gibbsite from the precipitation stage prior is roasted up to 1100° C. in order to drive off both free moisture and chemically bound moisture in order to produce alumina solids. It resembles clay calcination in process design, with differences in reaction temperatures and quality specifications. Further, while clay calcination requires a reducing zone, alumina calcination does not require a reducing zone.

A variety of calcination technologies may be used for this alumina calcination heating, including rotary kilns, gas suspension calciners, and fluidized bed calciners. An alumina calcination plant may include a series of preheater cyclones where the material is dropped through a series of cyclones with hot gas from the calciner or furnace rising and preheating the material to the reaction temperature. This stage both heats up the raw material to reaction temperature and evaporates free moisture in the material. The preheated solid material is then dropped into the calcination reactor (rotary kiln, calciner, etc.). Here it is heated to a temperature of approximately 1100° C., where the chemically bound water is released, creating anhydrous alumina.

Traditionally, a fossil fuel (e.g., natural gas) is burned at the base of the furnace, generating hot gases to transfer heat both convectively and radiatively to the material feed. Often, for heat recovery purposes, the calcined raw material is cooled in cooling cyclones where ambient air directly contacts the calcined alumina exchanging heat, cooling the alumina to near ambient temperatures. The heated ambient air used to cool the alumina may be supplied to meet other heat demands in the process. This can be used as preheated combustion air for the burners, or in the case of gas suspension or fluidized bed calciners, as the air flow which maintains sufficient velocities to fluidize or suspend the solid material throughout the calciner and preheat stages of the process. In both cases, heat from the thermal storage unit enables less fuel to be burned to both maintain sufficient gas flow and reaction temperatures. The alumina may be further cooled with water in heat exchangers indirectly in conjunction with cooling air.

In some example implementations, the primary working fluid of the thermal energy storage system would contact the material to be calcined. In other example implementations, this heating may occur indirectly, where the primary working fluid of the thermal battery does not directly contact the material. The hot gas would be blown through the calciner at sufficiently high velocities to achieve desired level of suspension and activation. The gas effluent would leave the chamber at a high temperature to be used in the steam generation and superheating of the process steam used in the first stage of calcination as well as any other steam needs in the system.

Figure 7:
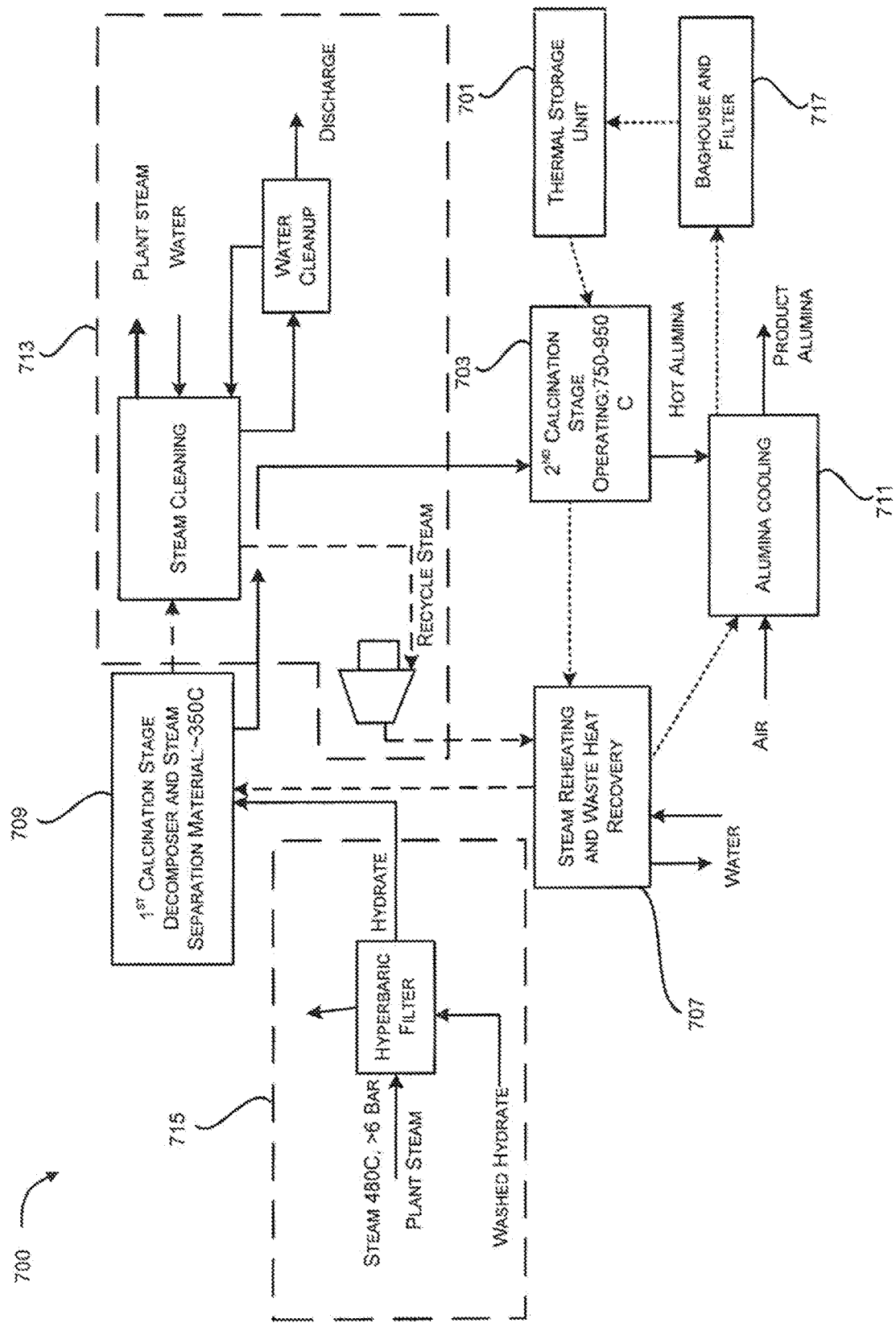

As shown in FIG. 7, a calciner process 700 associated with aluminum production according to the example implementations has several modifications to prior approaches. The thermal energy storage 701 provides a heat input to the second calcination stage 703. Thus, instead of using fuel to generate that heat, such as by combustion in other approaches, the heat is provided as hot gas heated by the TES system as explained above a high volume of high temperature hot gas is provided as an input to the second calcination stage at its operating temperature. Thus, it is not necessary to provide preheated air from alumina cooling 711, as may be required in prior approaches.

The output byproduct of the second calcination stage 703 is slightly cooled gas that can be used for the heat recovery steam generator 707, instead of the additional fuel and air that may be present in the prior approaches. The steam output from the steam generator 707 is provided to the first calcination unit 709 at the temperature of the first calcination unit 709, which may provide the recycled steam flow and solids as in the prior art. Additionally, instead of expelling excess heat or waste heat from the steam generator as a set gas, the heat byproduct of the steam generator is the gas that has passed through a heat recovery zone, and is injected into the alumina cooling cyclones 711, along with ambient air. The byproduct heat from the alumina cooling cyclones is provided, through a baghouse and filter 717, as the recirculated gas for the input of the thermal storage unit. According to an alternative implementation, the TES system may only be used for providing the heat for the steam generator, so that the existing infrastructure of the alumina processing facility can be used without substantial modification.

The example material activation system may have various benefits and advantages. For example, because the output of the waste heat recovery is recirculated as an input to the thermal energy storage, emission of heat through the stack is avoided. Thus, unnecessary heat emissions to the atmosphere can be avoided. Additionally, by using the incoming heat from the TES system, it is not necessary to use fossil fuel to provide the input heat. Further, because the combustion aspect of generating heat is removed, the free moisture in the input combustion stream is eliminated, which avoids the problems introduced by the presence of that moisture, particularly with respect to the calcination of clay, as explained above. The example implementation also has a benefit of more favorable thermodynamics and lower maximum temperatures.

Inventive Concept

Innovations are disclosed in the following discussion in which an electric-to-thermal energy storage system provides direct heat to an alumina calcination process. A portion of the added heat would be recirculated to the thermal energy storage system instead of being exhausted to the environment which is the case in fired calcination processes of conventional systems. The innovative designs enable zero- or low-carbon alumina calcination by reducing overall energy demand of the process via waste gas recirculation and by allowing heat to be provided from an intermittent charging from electricity. If renewable electricity is used to charge the thermal energy storage system, it enables the process to be zero-carbon. The invention may also enable more favorable thermodynamic conditions for the reaction to occur by being able to inject hot gas of any mixture of molecular components (e.g. air, pure $CO_2$, etc.). This serves the purpose of creating a thermodynamically favorable environment for the dehydroxylation reaction to take place by minimizing water vapor content (which exists in combustion) and (in the $CO_2$ thermal storage working fluid case for example) allows for more favorable heat transfer kinetics due to the ability of $CO_2$ to participate in radiative heat transfer.

The thermal energy storage (TES) system may inject a hot gas to supply or some of the heat that would otherwise be supplied to the raw material via firing hydrocarbon fuel in a burner.

In one implementation of the invention, the design allows for converting an existing calcination process into an oxyfuel-fired case for the purpose of easy carbon dioxide capture for recirculation in the TES and for export to an enhanced oil recovery (EOR) application, industrial use, or sequestration. Converting to oxyfuel without the TES integration would require a new process configuration and new plant. Many alumina calcination processes are very dependent on having sufficient gas flow to suspend the raw material to promote proper material flow through the plant and to enable sufficient heat transfer between the gas and raw material.

In a traditional plant being converted to oxyfuel, there are two places where gas flow is negatively affected. The first is that the cooling air is often heated by the activated material before being introduced to the calciner and preheater to suspend and heat the raw material. In an oxyfuel case, its purpose would be defeated by introducing ambient air to the process, since the exit gas mixture would not be pure water vapor and carbon dioxide hence making carbon capture energy intensive and expensive. The result is that a large portion of the hot gas flow introduced is excluded from the heating stages of the process.

Additionally, oxyfuel combustion generates fewer combustion products per amount of heat provided due to the flame not having to heat inert components of air such as nitrogen. The thermal energy storage system depicted in FIG. 10 allows an oxyfuel process with relatively minimal intrusion to traditional processes. The missing hot gas from the cooling air and traditional combustion is replaced with hot gas from stored intermittent electric charging. In addition, the overall thermal efficiency of the process is improved due to the carbon dioxide recirculating through the storage system. More specifically, exposing the raw material to a stream with majority carbon dioxide may improve kinetics and thermodynamics of the reaction due to carbon dioxide's ability as a polar molecule to participate in radiative heat transfer as well as reducing the water vapor partial pressure compared to conventional systems, making the hydroxylation reaction more thermodynamically favorable.

The same advantage is achieved if the primary burner is converted to burn pure hydrogen. The resulting combustion products are mostly water vapor, although, as in the oxyfuel case, less flue gas volume is produced per unit heat provided. In this implementation, the cooling air can be utilized, since there is no capturable carbon dioxide gas, and the thermal energy storage system can supply additional high-temperature air to allow for sufficient gas flows and heat delivery to the raw material in a conventional system's calcination process. In this case, the TES system would not need to recirculate nearly pure carbon dioxide. The implementation would resemble the process depicted in FIG. 9, with the only modification being that the "hydrocarbon" fuel is hydrogen. After water knock-out and particulate/fines (e.g., finely crushed or powdered material) removal, a portion of the gas is recirculated back into the TES system.

Advantages provided by the present innovative systems and processes include the enabling design for high-temperature activation/calcination of alumina to become less carbon intensive in an efficient manner (i.e., without extensively altering existing physical systems and processes). Additionally, the design improves the energy intensity of the alumina calcination process, and alleviates plant constraints, such as required gas flow rates, which enables relatively simple conversion to alternative combustion techniques such as oxy-fuel or hydrogen burners. This reduces the direct emissions tied to the calcination process, either by easy carbon capture techniques (oxyfuel) or by eliminating the use of hydrocarbons (hydrogen). Optionally, the hydrogen and/or oxygen may be provided (or supplemented) by a solid oxide electrolysis or solid oxide fuel cell.

Systems and Processes

The above advantages are achieved as follows: first, the innovative system lowers the carbon intensity of the process by using heat from electric sources to replace heat otherwise provided by burning hydrocarbon fuel. Using intermittent electric charging of the thermal energy storage unit allows energy from renewables such as wind and solar be used in providing continuous heat to the calcination process in a way that does not require a drastically different plant process. The impact on the plant process can be emphasized in viewing FIGS. 8C, 10 and 11. In comparing these process flows to conventional processes, an important change is the number of burners and the presence of the thermal energy storage system, along with the tie-in, which reroutes a portion of the gas heading to the stack exhaust to the thermal energy storage system inlet fluid.

The raw material can still be heated convectively through mixing with hot gas. Calciners and preheating sections in conventional systems may require some modification, but these modifications are minimal compared to alternative carbon free options such as using electric heaters directly in the mix or converting to oxyfuel or hydrogen. In other processes (depicted in FIG. 7), the thermal storage unit can provide heat to the process as direct hot gas or as steam generation for use in a high-pressure steam partial calcination stage before the traditional high temperature stage 2, where hot gas is introduced to the system to supplement or replace the duty of fired heat from a burner.

The energy intensity is improved in one of two ways. The first one is having the ability to control the reaction atmosphere. The thermal energy storage (TES) system may be able to circulate any mixture of gases, whether that be a pure substance such as $CO_2$ or a mixture such as air or recirculated flue gas products. This enhanced atmosphere control allows the underlying reaction to be more thermodynamically favored. In the alumina case, the main reaction is hydroxylation, where chemically bound water is released as vapor at high temperatures. In an environment that minimizes the partial pressure of water vapor, the desired reaction direction is thermodynamically favored, reducing the temperature requirement of the activation.

The second (and more significant) way is through the thermal energy storage system accepting input gas at a temperature between ambient and 200° C. Once the gas stream is filtered and water is removed, the gas stream exiting the preheating/drying stage of the process can be routed back into the thermal energy storage (TES) system. This saves sensible heat of heating gas at ambient temperature from ambient conditions (e.g. 20° C.) to the hot gas temperature to the calcination heating process (e.g. >900° C.). This heat would otherwise be expelled to the environment in a conventional fired process, due to the relatively low temperature of the gas.

One way to reduce the carbon emissions is by using oxy-fired or oxyfuel combustion. This means that oxygen is generated externally (usually in an air separation unit) and is fired with the fuel (such as natural gas). The resulting flue contains only $H_2O$ and $CO_2$, since the other components of air are separated out in the air separation unit. The main purpose of this is to enable easy carbon capture of a fired process.

Water can easily be separated from $CO_2$ due to water condensing at ambient temperatures. $CO_2$ removal is much more difficult (e.g., energy intensive and expensive) when other components of air are present in the stream. The oxygen combustion heats the raw material as the thermal storage unit injects more high-temperature recirculated $CO_2$. Here, the primary burner would supply the highest temperature heat radiatively and convectively, with all supplementary heat being supplied by the hot fluid injection from the thermal energy storage (TES) system.

The cooling stage, which normally provides high-temperature, high-velocity gas flow, can be advantageously separated from the process train, in order to avoid mixing ambient air with the pure $CO_2$ and water vapor stream. The heated ambient cooling air may indirectly exchange heat with the thermal storage unit inlet flow of nearly pure $CO_2$ or be used to preheat water for steam generation for use elsewhere in the plant, or for power generation.

Figure 10:
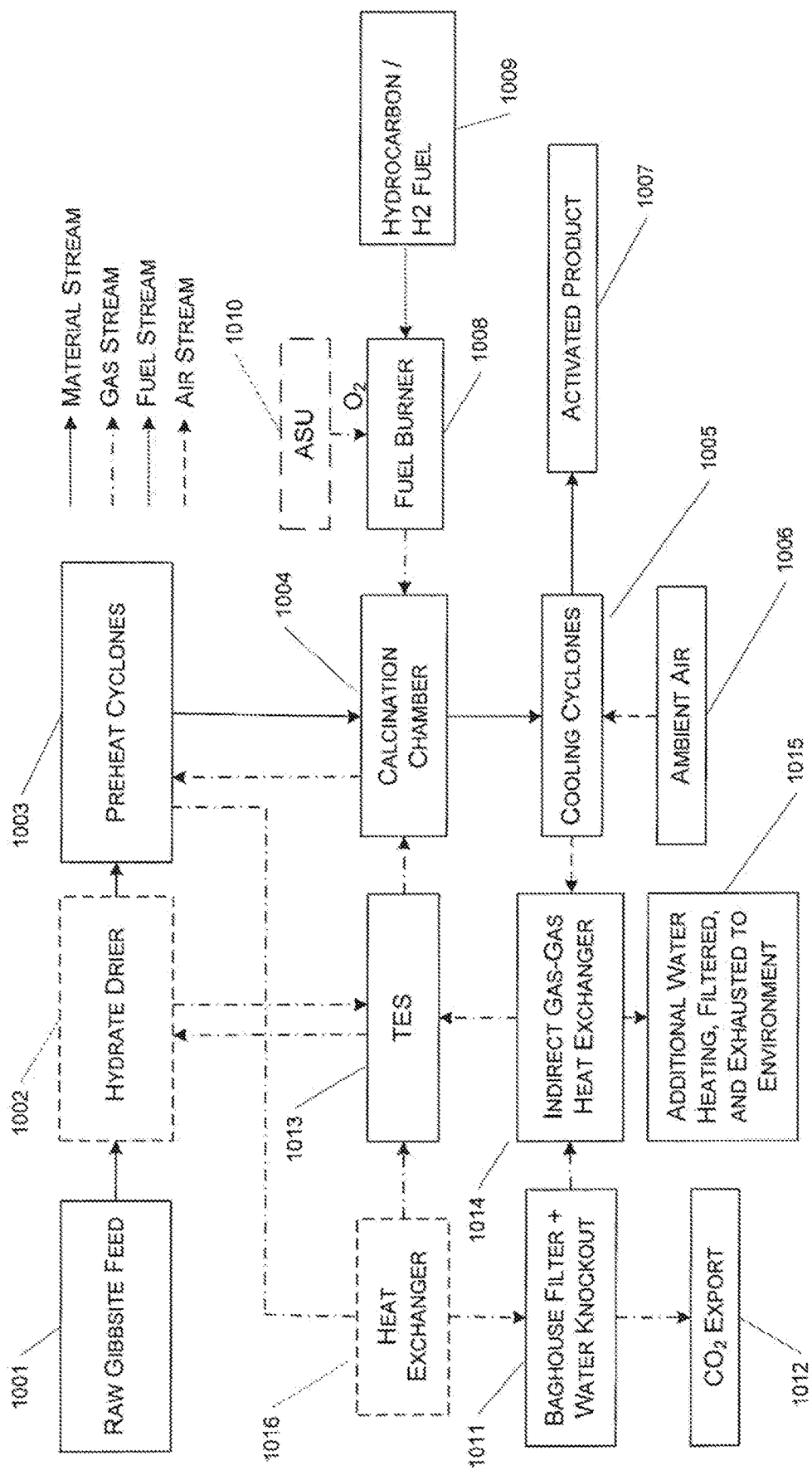

Additionally, oxy-fired combustion results in higher temperatures and lower flue gas flow rates. The gas flow of the modified system may be insufficient to suspend or lift the raw material in the process. The thermal energy storage (TES) system injects sufficient gas into the calciner to provide the necessary heat for the reaction to proceed. The flue gas and the injected air from the TES unit would mix and flow up through the process preheating raw material above the calciner. Eventually, the water is knocked out of the stream by condensation (lowering the temperature of the gas stream) and a pure $CO_2$ stream remains. A portion of the $CO_2$ is recirculated into the TES unit, with the remaining portion able to be compressed and transported for use in an industrial application, sequestered, or in EOR. A schematic of the oxyfuel case is depicted in FIG. 10.

The TES system can supply heat and integrate to the alumina calcination process in a means similar to its integration into a clay calcination process. Combustion in burners may be reduced or eliminated with the majority or all the heat input to the system coming from the thermal energy storage system. Hot gas that has been heated by the thermal energy storage system may be injected to contact and interact with the raw material. This gas may be air or another working fluid such as $CO_2$ or a mixture in any proportion of gases including air, oxygen, and $CO_2$.

Figure 9:
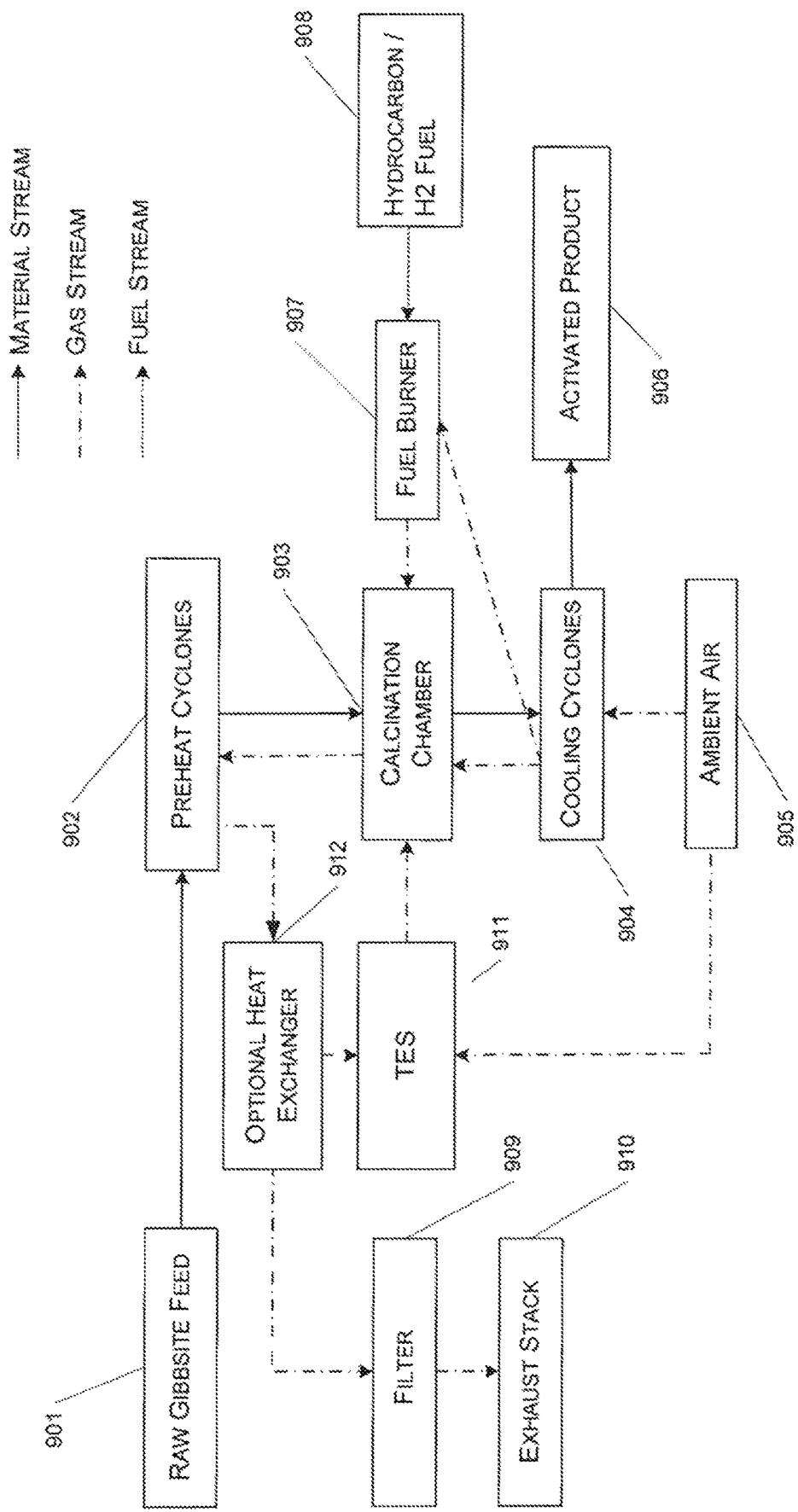

One implementation, shown in FIG. 9, has the TES system providing a first portion of the process heat and a fuel burner providing a second portion. In this example, the thermal energy storage system reduces the fuel consumption of the burners, and a portion of the exhaust gas that is normally released to the environment after particulate filtering is recirculated back into the thermal energy storage system for reheating. The gas being passed through the thermal energy storage system may also include air from the environment in order to control temperature and modulate the gas mixtures chemical composition.

The use of $CO_2$ as the heat transfer gas from the thermal storage unit to the process is beneficial in the case in which the overall system is designed or converted to drive combustion with nearly pure oxygen. This method of burning is generally referred to as oxy-fired or oxyfuel combustion. In such instances, oxygen may be generated externally (usually in an air separation unit) and is fired with the fuel (such as natural gas). The resulting flue primarily contains only $H_2O$ and $CO_2$ as the other components of air are separated out in the air separation unit. The main purpose of this is in enabling easy carbon capture from the exhaust of a fired process without requiring nitrogen separation. Water can be easily separated from $CO_2$ due to water condensing at ambient temperatures. $CO_2$ removal is much more difficult (energy intensive and expensive) when other components of air are present in the stream. By carrying heat from the thermal energy storage system in a $CO_2$ stream, and using oxy-fuel combustion, very high temperatures may be achieved without subsequent costs of gas separation for $CO_2$ capture. In one implementation, a fuel-fired burner would supply the highest-temperature heat and a thermal energy storage system's hot gas injection would supply all other heat, either more or less than half the total heat required by the process. The gas flow from the thermal energy storage system at a first temperature would be raised to a higher second temperature by such combustion.

In another implementation, the gas flow from the thermal energy storage system at a first temperature would be raised by an electric heater to a higher second temperature, instead of by combustion. Such an electrical heater may be powered by a turbine generator which is powered by heat from a thermal storage unit.

In configurations which burn fossil fuels in the presence of nearly pure oxygen and in which it is desirable to retain a relatively pure $CO_2$ stream, the gas flow from a cooling stage may need to be separated from the higher temperature process train in order to avoid mixing ambient air with the pure $CO_2$ and water vapor stream. The heated ambient cooling air may indirectly exchange heat with the thermal energy storage system inlet flow of nearly pure $CO_2$ or be used to preheat water for steam generation for use elsewhere in the plant or for power generation. Additionally, oxy-fired combustion results in higher temperatures and lower flue gas flow rates. The gas flow of the modified system may be insufficient to suspend or lift the raw material in the process. Gas flowing through the thermal energy storage system may inject sufficient gas in the calciner to provide the necessary heat for the reaction to proceed. The flue gas and the thermal storage units' injected air would mix and flow up through the process, preheating raw material above the calciner. Eventually, the water is knocked out of the stream by condensation (lowering the temperature of the gas stream) and a pure $CO_2$ stream remains. A portion of the $CO_2$ may be recirculated and heated into the thermal energy storage system with the rest able to be compressed and transported for use in an industrial application, sequestered, or in enhanced oil recovery (EOR) A schematic of the oxyfuel case is depicted in FIG. 10.

The same advantage is applied if the fuel-fired burner is burning hydrogen. The resulting combustion products are mostly water vapor although, as in the oxyfuel case, less flue gas volume is produced per unit heat provided. In this implementation, the cooling air can be utilized, since there is no capturable carbon dioxide gas, and the thermal energy storage system can supply additional high-temperature air to allow for sufficient gas flows and heat delivery to the raw material in a conventional calcination process. The thermal energy storage system would not need to recirculate nearly pure carbon dioxide in this case. The implementation would resemble the process depicted in FIG. 11 with the only modification being that the "hydrocarbon" fuel is replaced with hydrogen. After water knockout and particulate/fines removal, a portion of the gas is recirculated back into the thermal energy storage system.

In some implementations, the thermal energy storage system delivers heat at a suitable temperature and replaces all burners in which case the hot gas would be injected at the base of the calciner and be recirculated to the storage system after calcining, preheating, and drying the raw gibbsite material. In some implementations, an electrically powered heater may be in the outlet gas stream, so as to lift the outlet gas temperature above the internal thermal storage temperature. In such cases there is no requirement for $CO_2$ capture, and the design of coolers and airflow may follow the means conventionally used in the prior art. This is shown in FIG. 13.

The stream may need some treatment before re-entering the thermal energy storage system (i.e. water removal and particulate removal via filter). This is shown in FIG. 10. The stream may also interact with the cooling stage of the process in order to preheat the recirculated gas prior to entering the thermal storage unit.

Additionally, any thermal storage-calcination integration described throughout this disclosure may also apply to this alumina calcination process. In the description of the clay calcination process, there are minor differences in the process such as the reducing zone for quality control and temperature differences. However, it should be noted that any described tie-in spot for the thermal storage along with the respective benefits that each integration provides the plant are shared amongst all described calcination processes, especially between clay and alumina, due to a shared underlying chemical process of hydroxylation. Additionally, throughout the above invention description, wording such as preheating cyclones, cooling cyclones, and calciners are examples of conventional calcination processes, but do not describe the details of what may be found in prior art processes.

For the purposes of the integration, preheating and cooling does not have to take place in a cyclone, as there are other methods for completing this stage. If calcining in a rotary kiln, sometimes there is no clear preheating stage, for "preheating" happens at the end of the kiln furthest from the flame. In rotary kiln cases, material is often cooled in rotary coolers that operate on the same principle, using cooler gases to convectively cool the activated material. Hence, preheating can mean any stage in a calcination process where hot gases convectively heat raw material closer to the activation reaction temperature and cooling means any process in a calcination process in which cooler gas convectively cools the hot activated material after exiting the kiln or calciner.

Example Implementations of a Calcination System with an Integrated Thermal Energy Storage System.

Figure 8A:
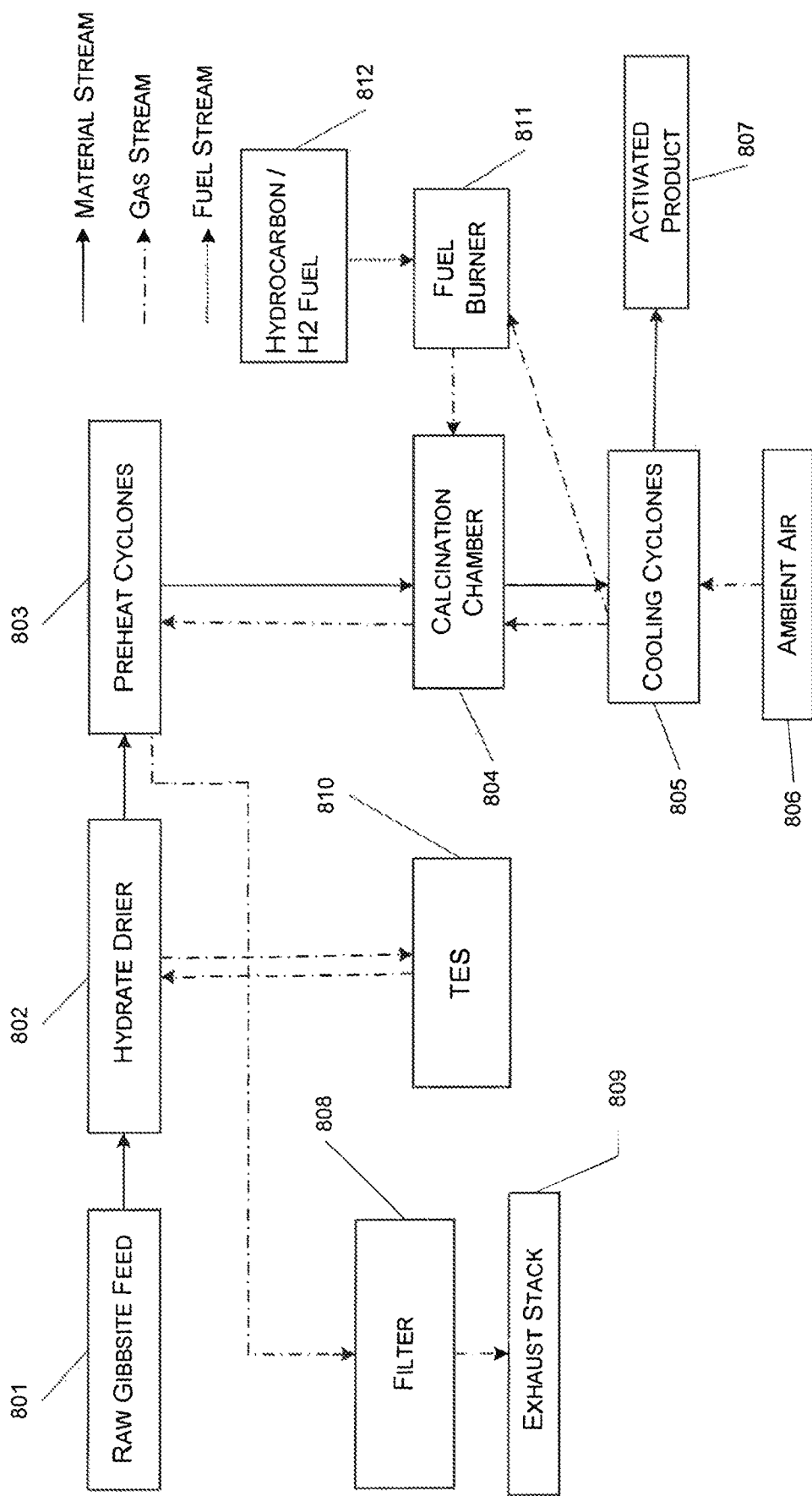
FIG. 8A illustrates a calciner process with an integrated thermal energy storage (TES) system according to an example implementation.
Figure 8B:
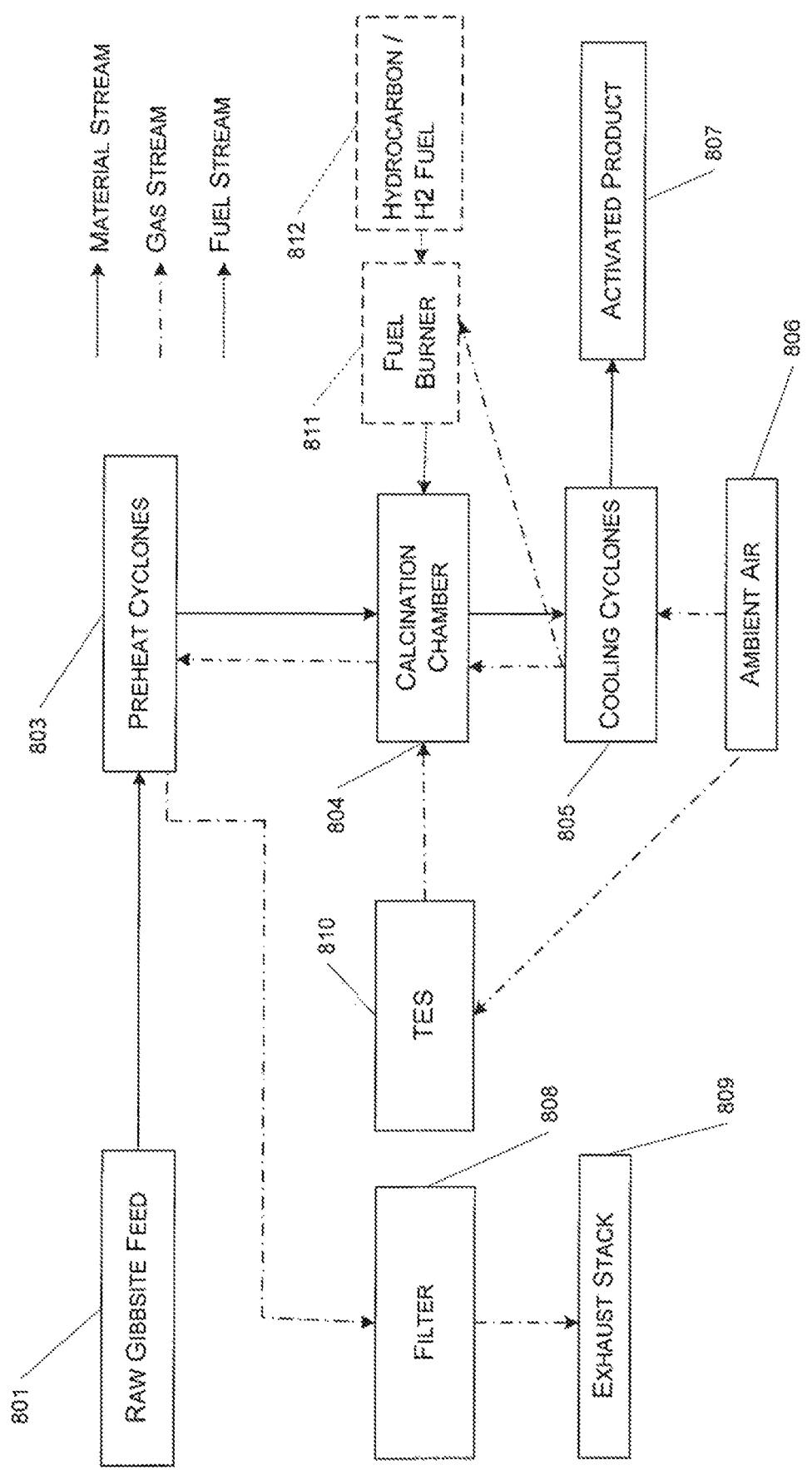
FIG. 8B illustrates a calciner process with an integrated thermal energy storage (TES) system according to another example implementation.
Figure 8C:
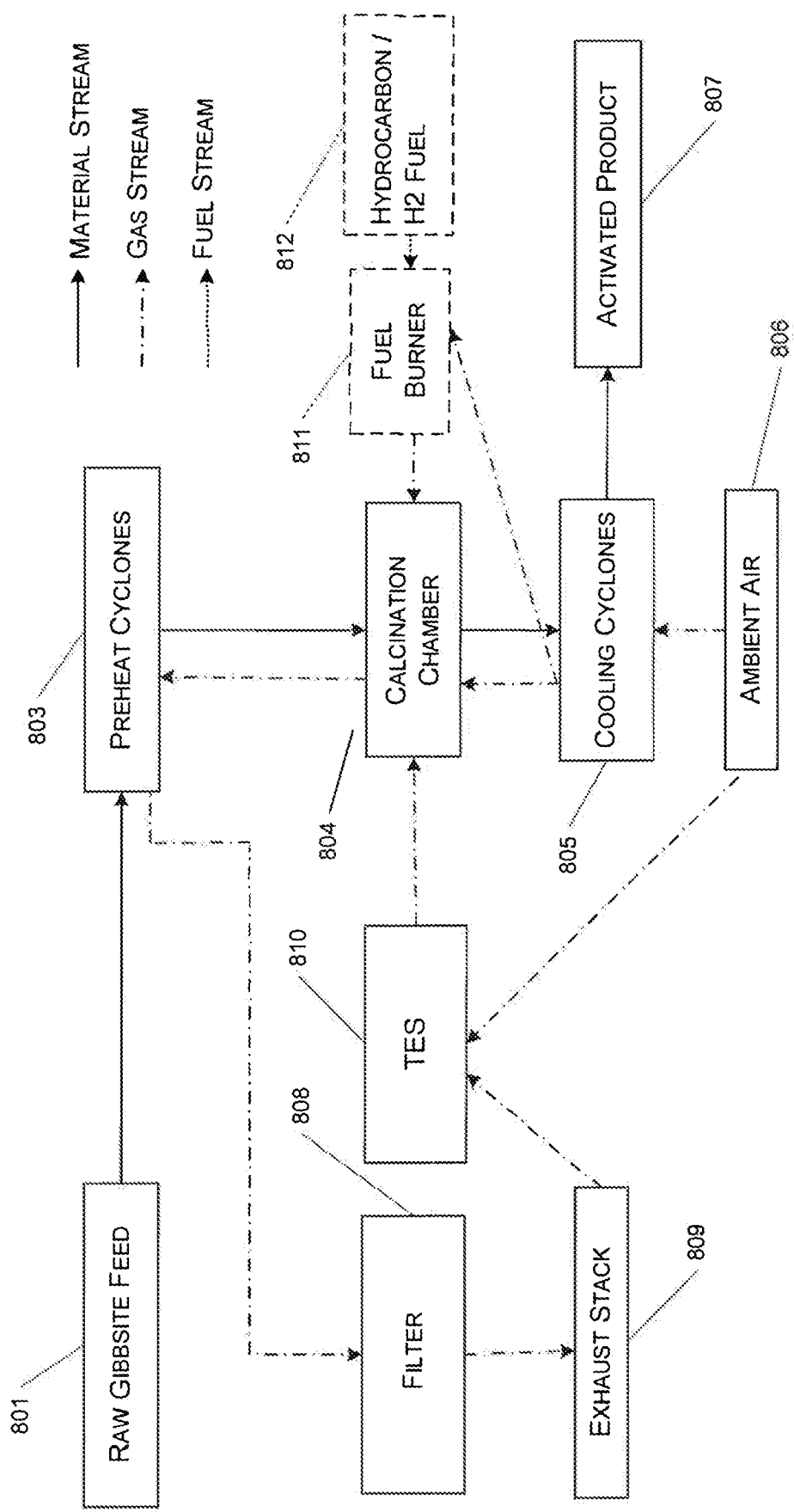
FIG. 8C illustrates a calciner process with an integrated thermal energy storage (TES) system according to yet another example implementation.

FIGS. 8A-8C illustrate three scenarios for the integration of a thermal energy storage (TES) system with a conventional calcination system. The scenarios will be described in order of intrusiveness from less intrusive to more intrusive towards conventional calcination process based on the amount of retrofit or modification to existing equipment is needed for the integration. The elements of a calcination system with an integrated TES systems common to all three of the following scenarios include a raw gibbsite feed 801, preheat cyclones 803, a calcination chamber 804, a cooling cyclone 805, a filter 808, an exhaust stack 809, fuel burner 811, hydrocarbon or hydrogen fuel 812 and a thermal energy storage (TES) system 810. Although only one or two of each component is illustrated, it should be understood that the calcination system may comprise any number of each component, including a plurality of one or more components.

Raw gibbsite feed 801 receives raw gibbsite and feeds it to preheat cyclone 802 to start the preheat process before entering calcination chamber 803. In particular, raw gibbsite feed 801 transports raw gibbsite starting material used in the production of aluminum. Different types of feeders may be used as raw gibbsite feed 801, including belt feeders, screw feeders, vibrating feeders, apron feeders, or rotary feeders.

In accordance with the least intrusive scenario illustrated in FIG. 8A, the TES 810 provides moderate heat to a hydrate drier 802. The raw material is fed as a material stream to hydrate drier 802 which is configured to remove moisture and dry the raw material from a first moisture content to a second, lower moisture content. More specifically, hydrate drier 802 receives heated fluid from the thermal energy storage system 810, heats the material stream to evaporate extra moisture, and the material stream including the dried raw material is fed from the hydrate drier 802 to the preheat cyclone 803. This scenario is considered less intrusive because a drier and a TES system can be retrofit into an existing calcination process without necessitating major modifications to existing equipment. Thermal energy storage system 810 provides heat to hydrate drier 802 such that the heat transfer fluid (air or steam) indirectly heats the wet hydrate (gibbsite). This lends to greater energy efficiency, as thermal energy storage (TES) system 810 heat transfer fluid, after drying, is recirculated back to the TES for reheating instead of being exhausted to ambient at an elevated temperature.

This also enables greater operational flexibility for the facility as the calciner's operating conditions are detached from the feed hydrate's moisture content without needing to burn additional fuel. Every 1 wt-% reduction in hydrate moisture content reduces the specific fuel consumption by 20-30 kJ/kg. Additionally, increasing the hydrate temperature further reduces the specific fuel consumption by approximately 1 kJ/kg for every 1° C. of increased temperature.

Preheat cyclones 803 receives dried raw gibbsite from hydrate drier 802 preheat the dried raw material to a temperature between 800 and 1000° C. before it enters calcination chamber 1-4. Preheat cyclones 803 work by using a cyclonic action to circulate hot gases around the raw material. Preheat cyclones 803 also help to reduce the amount of fuel required to heat the raw material with the waste heat from combustion chamber 804. Once the dried raw gibbsite is heated to the desired temperature, the material enters calcination chamber 804.

Calcination chamber 804 receives heated raw gibbsite from preheat cyclones 803 to provide a controlled environment for the calcination process, which involves heating the gibbsite to a high temperature in the absence or presence of air. The dried raw product from the preheat cyclones 803 is heated by the combustion of hydrocarbon or hydrogen fuel 812 in fuel burner 811. Calcination chamber 804 is designed to maintain a specific temperature range and atmosphere to ensure that the material being processed is heated uniformly and without contamination. Calcination chamber 804 may be lined with heat-resistant materials to prevent damage to the chamber walls, and may be equipped with gas inlets and outlets to allow for the regulation of gas flow and the removal of byproducts generated during the calcination process.

Thermal energy storage system 810 provides heat to hydrate drier 802 such that the heat transfer fluid (air or steam) indirectly heats the wet hydrate (gibbsite). This lends to greater energy efficiency, as thermal energy storage system 810 heat transfer fluid, after drying, is recirculated for reheating instead of being exhausted at an elevated temperature.

This also enables greater operational flexibility for the facility as the calciner's operating conditions are detached from the feed hydrate's moisture content without needing to burn additional fuel. Every 1 wt-% reduction in hydrate moisture content reduces the specific fuel consumption by 20-30 kJ/kg. Additionally, increasing the hydrate temperature further reduces the specific fuel consumption by approximately 1 kJ/kg for every 1° C. of increased temperature.

Cooling cyclones 805 receive the product from calcination chamber 804 to reduce the cool down through the intake of ambient air 806. The heated material from calcination chamber 804 is fed into the top of the cyclone, and as it spirals down through cooling cyclones 805, it is cooled by the flow ambient air 806 that is drawn in through the bottom of cooling cyclones 805. The cool air absorbs the heat from the hot material, and the material is gradually cooled down to a safe handling temperature through activated product 807 output.

Filter 808 receives exhaust gases from preheat cyclones 803 to remove particulate matter from exhaust gases before they are released into the atmosphere through exhaust stack 809. Filter 808 works by using a series of fabric bags to capture and remove particulate matter from the exhaust gases. The bags may be made from a woven fabric that is designed to allow air to pass through while trapping particles. As the exhaust gases pass through the bags, the particles become trapped in the fabric. The gas stream output of the calcination chamber 804 may be provided to the preheater cyclones 803, filter 808 and exhaust stack 809. The reduced product is provided to cooling cyclones 805, where ambient air 806 is provided for cooling, and may also be provided as an input to the thermal energy storage system 810 (see e.g., FIGS. 8B and 8C). An activated material, such as alumina, is provided at activated product 807.

In accordance with the scenarios illustrated in FIGS. 8B and 8C, the hydrate drier is eliminated, and high temperature heat generated by the TES 810 is provided directly to the calcination chamber 804. Intermittent electric charging of the thermal energy storage system 810 allows energy from renewables such as wind and solar to be used in providing continuous heat to calcination chamber 804 in a way that does not require a drastically different plant process. Optionally and/or additionally, fuel burner 811 provides a second portion of the heat, which is fueled by hydrocarbon/$H_2$ fuel 812. The TES 810 may receive a stream of ambient air 806. The gas stream may require some treatment before re-entering thermal energy storage system 810 (i.e., water removal and particulate removal via filter). The gas stream may also interact with the cooling stage of the process cooling cyclones 805 in order to preheat the recirculated gas prior to entering thermal energy storage system 810, as shown and discussed with respect to FIGS. 11 and 12 below. In accordance with the third scenario illustrated in FIG. 8C, the TES 810 receives additional input gas from the exhaust stack 809.

Calcination System Including Integrated Fuel-Fired and Renewable Heat and Power from Thermal Energy Storage System FIG. 9 illustrates an integrated fuel-fired and TES system for providing heat to power a calcination system with the TES system providing a first portion of the process heat and the fuel burner providing a second portion. The calcination system comprises a raw gibbsite feed 901, a preheat cyclones 902, a calcination chamber 903, a cooling cyclone 904, a fuel burner 907, a filter B.2-9, an exhaust stack 910, a thermal energy storage system 911, and an optional heat exchanger 912. These components may be similar or identical to those that have already been described in FIG. B.1, and therefore, will not be described herein.

In one implementation, the raw material is provided at raw gibbsite feed 901. The raw material is fed to preheat cyclones 902. At calcination chamber 903, the product that is fed through preheat cyclones 902 and heated with non-combustive fuel at calcination chamber 903. Calcination chamber 903 is heated with non-combustive fluid provided from thermal storage unit 9011, which is provided by renewable energy from thermal energy storage system 911. Additionally, fuel burner 907 provides a second portion of the heat, which is fueled by hydrocarbon/$H_2$ fuel 908. The gas stream may also be provided to preheater cyclone 902, filter 909 and exhaust stack 910. Optional heat exchanger 912 may be incorporated to transfer heat from preheat cyclones 902 to the filter 909, and to heat the input fluid to the thermal energy storage system 911. The reduced product is provided to cooling cyclones 904, where ambient air 905 is provided for cooling. Ambient air 905 may also be circulated into thermal energy storage system 911. Activated material includes material which has been dehydroxylated, such as alumina. Activated material is provided as a product at activated product 906.

Thermal energy storage system 911 can supply heat and integrate to the alumina calcination process in a means similar to its integration into a clay calcination process described in greater detail above. Combustion in fuel burners 907 may be reduced or eliminated with the majority or all the heat input to the system coming from the thermal energy storage system 911. Hot fluid (e.g., hot gas) that has been heated by the thermal energy storage system 911 may be injected to contact and interact with the raw material coming from the raw gibbsite feed 901 and passing though preheat cyclones 902. This gas may be air or another working fluid such as $CO_2$ or a mixture in any proportion of gases including air, oxygen, and $CO_2$.

One implementation has the thermal energy storage system 911 providing a first portion of the process heat, and a fuel burner 907 providing a second portion. Fuel burner 907 receives hydrocarbon/$H_2$ fuel 908 to reduce the fuel consumption of fuel burner 907. The fuel is mixed with air or oxygen and ignited to produce a flame, which provides the heat energy required for calcination. In this example, the thermal energy storage system 911 reduces the fuel consumption of fuel burner 907, and a portion of the exhaust gas that is normally released to the environment after particulate filtering is recirculated back into the thermal energy storage system 911 for reheating. The gas being passed through thermal energy storage system 911 may also include ambient air 905 from the environment in order to control temperature and modulate the gas mixtures chemical composition.

Calcination System Including Integrated Oxyfuel-Fired and Renewable Heat and Power from Thermal Energy Storage System FIG. 10 illustrates an integrated oxyfuel-fired and renewable heat and power system powering a calcination system with the thermal energy storage system according to an example implementation. The calcination system comprises a raw gibbsite feed 1001, an optional hydrate drier 1002, a preheat cyclone 1003, a calcination chamber 1004, a cooling cyclone 1005, a fuel burner 1008, an optional air separation unit 1010, a filter with water knockout 1011, a $CO_2$ export 1012, a thermal energy storage system 1013, and indirect gas-gas heat exchanger 1014 that receives the output heated fluid of the cooling cyclones 1005 and the heated fluid output from the filter 1011, and an optional heat exchanger 10016. These components may be similar or identical to those that have already been described in FIGS. 8-9 and therefore, will not be described herein.

In one implementation, the raw material is provided at raw gibbsite feed 1001. The system may include an optional hydrate drier 1002 to remove moisture from raw material. The raw material is fed to preheat cyclones 1003. At calcination chamber 1004, the product that is fed through the cyclones and heated with non-combustive fuel at the calcination chamber 1004. Calcination chamber 1004 is heated with non-combustive fluid provided from thermal storage unit 1013, which is provided by renewable energy from thermal energy storage system, 1013. Additionally, a fuel burner 1008 can be fed oxygen by optional air separator unit 1010 to provide a second portion of the heat through oxyfuel combustion. By burning with oxygen instead of air, the result is cleaner burning at a higher temperature, with no $NO_X$ related byproducts as would be produced with air as an input for the fuel burner 3-8.

The gas stream may also be provided to preheater cyclones 1003, filter and knockout 1011 and an indirect gas-gas heat exchanger 1014. The reduced product from calcination chamber 1004 is provided to cooling cyclones 1004, where ambient air 1006 is provided for cooling, either directly or indirectly via the cooling cyclones 1005. An activated material, such as activated alumina is provided as an output at activated product 1007. Additionally, oxy-fired combustion results in higher temperatures and lower flue gas flow rates. The gas flow of the modified system may be insufficient to suspend or lift the raw material from the raw gibbsite feed 1001 in the process. Thermal energy storage system 1013 injects sufficient gas into calciner chamber 1004 to provide the necessary heat for the reaction to proceed. The flue gas and the injected air from thermal energy storage system 1013 mix and flow up through the process preheating raw material above calciner chamber 1004. Eventually, the water is knocked out of the stream by condensation (lowering the temperature of the gas stream) through filter and water knockout 1011 and a pure $CO_2$ stream that remains is exhausted through $CO_2$ export 1012. A portion of the $CO_2$ is recirculated into thermal energy storage system 10013, with the rest of the $CO_2$ configured to compressed and transported for use in an industrial application, sequestered, or used in EOR. In accordance with another implementation, an optional heat exchanger (not shown) may be provided to produce steam using the heat from the exhaust gas exiting the calcination chamber 1004. The produced steam may be used as input steam to drive a turbine (not shown) to generate electricity.

In configurations which burn fossil fuel and in which it is desirable to retain a relatively pure $CO_2$ stream, the gas flow from a cooling stage at cooling cyclones 1004 may need to be separated from the higher temperature process train in order to avoid mixing ambient air with the pure $CO_2$ and water vapor stream. The heated ambient cooling air may indirectly exchange heat with thermal energy storage system 10013 inlet flow of nearly pure $CO_2$ or be used to preheat water for steam generation for use elsewhere in the plant or for power generation.

Figure 11:
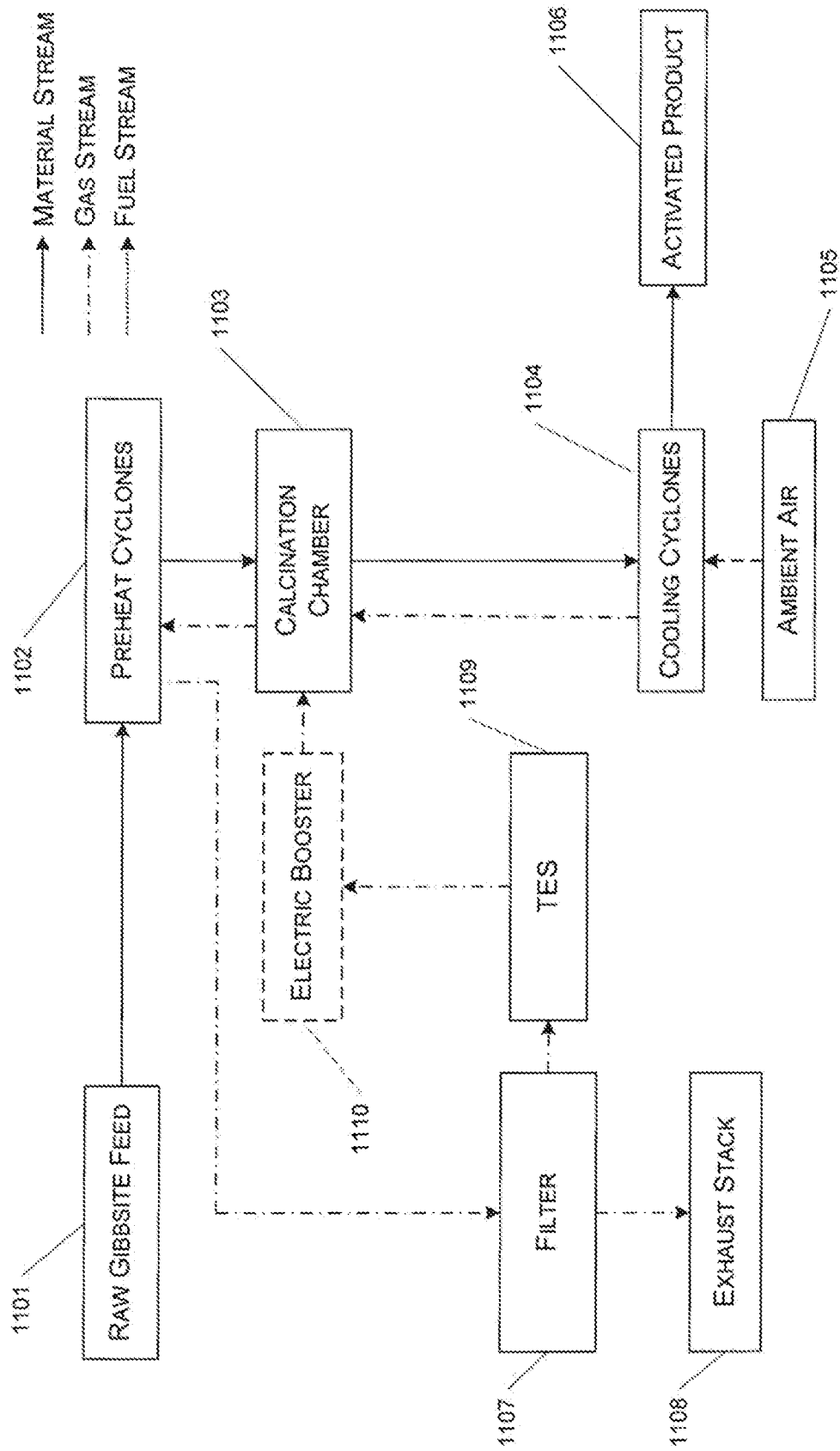

Calcination System Including Renewable Heat and Power from Thermal Energy Storage System with Electric Booster FIG. 11 illustrates a calcination system with an integrated TES system with optional electric booster for providing high temperature gas to the calciner to increase the bulk temperature of the incoming gas streams (primary/secondary air within the reactor. The calcination system comprises a raw gibbsite feed 1101, a preheat cyclones 1102, a calcination chamber 1103, a cooling cyclone 1104, a filter 1107, an exhaust stack 1108, a thermal energy storage system 1109, and an optional electric booster 1110. Although only one or two of each component is illustrated, it should be understood that the calcination system may comprise any number of each component, including a plurality of one or more components. These components may be similar or identical to those that have already been described in FIG. 8A, and therefore, will not be described herein.

FIG. 11 shows the input to the TES 1109 as ambient air 1106. Although not shown in the example implementation in FIG. 11, it is understood that the TES 810 may also receive additional inputs of air and gas from one or more additional sources in the calcination process including but not limited to the output air from exhaust stack 809 and the output gas from the cooling cyclones 805. The output gas from the cooling cyclones 805 can be fed as a direct input to the TES 810. Optionally, if the output gas stream from the cooling cyclones 1104 is too dirty, it can be passed through an indirect gas-gas heat exchanger similar to the configuration shown by reference number 1014 in FIG. 10.

In some implementations, thermal energy storage system 1109 delivers heat at a suitable temperature and replaces all burners in which case the hot gas would be injected at the base of calciner chamber 1103 and be recirculated to thermal energy storage system 1109 after calcining, preheating, and drying the raw gibbsite material from raw gibbsite feed 1101. The temperature of the heated fluid coming from thermal energy storage system 1109 may be further lifted/increased via optional electric booster 1110. In some implementations, an electrically powered heater may be in the outlet gas stream to lift the outlet gas temperature above the internal thermal storage temperature. In such cases there is no requirement for $CO_2$ capture, and the design of coolers and airflow may follow the means conventionally used in the prior art. Modifications to the calciner may be required as heat transfer kinetics are reduced when radiant fuel-firing is replaced by the TES system. In some implementations, the heat provided to the calciner by the TES system is superheated steam. The improved heat transfer characteristics of steam compared to air may make the integration of the TES less intrusive and this provides opportunity for improved heat recovery such as preheating the boiler feedwater from cooling water in a fluidized bed cooler or water vapor knockout from the waste gas stream.

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EOR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic or other composition that can generate heat.

While foregoing example implementations may refer to "air", including $CO_2$, the inventive concept is not limited to this composition, and other fluid streams may be substituted therefor for additional industrial applications. For example, but by way of limitation, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the necessary properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A calcination system, including:
  a thermal energy storage (TES) system configured to store thermal energy derived from a variable renewable energy source having intermittent availability, wherein the TES system is configured to heat a storage medium using electricity from the renewable energy source, and deliver heat to a use in the form of a heated fluid;
  a calciner configured to receive and heat a material stream with thermal energy provided by TES and generate a calcined product; and wherein the TES system is configured to heat at least a first portion of the heated fluid; and
  a drier configured to evaporate moisture from the material stream having a first moisture content to a second, lower moisture content by transferring thermal energy from the heated fluid provided by the TES system into the material stream prior to entering the calciner.

2. The calcination system of claim 1 wherein the drier is a hydrate drier.

3. The calcination system of claim 1, further comprising a fuel burner configured to burn hydrogen or hydrocarbon fuel to provide a second portion of the heated fluid.

4. The calcination system of claim 3, wherein the fuel burner is configured to operate with combustion air having a higher oxygen composition by volume than in ambient air.

5. The calcination system of claim 1, wherein the calciner is further configured to remove impurities or volatile substances from the material stream and/or to incur thermal decomposition to the calcined product.

6. The calcination system of claim 1, wherein the fluid is a non-combustive fluid.

7. The calcination system of claim 6, wherein the non-combustive fluid includes carbon dioxide, air, steam, or a mixture of gases.

8. The calcination system of claim 1, wherein the material stream includes aluminum hydroxide, and the calcined product principally includes alumina.

9. The calcination system of claim 1, further including:
  a preheat cyclone configured to heat the material from the drier prior to entering the calciner;
  a cooling cyclone configured to cool heated product received from the calciner using a source of ambient air;
  and further configured to circulate exhaust fluid from one or both of the preheat cyclone and cooling cyclone back to the TES system as the fluid to be heated by the TES system.

10. The calcination system of claim 9, further including a heat exchanger configured to receive thermal energy obtained from the exhaust fluid from one or both of the preheat cyclone and cooling cyclone, and to apply the thermal energy from the exhaust fluid to heat the fluid that is input to the TES system.

11. The calcination system of claim 1, further including an electric booster configured to raise a temperature of the heated fluid delivered by the TES from a first temperature to a second higher temperature.

12. The calcination system of claim 11, further including a turbine generator configured to power the electric booster.

13. The calcination system of claim 12, wherein the TES system is configured to provide heat to at least partially power the turbine generator.

14. The calcination system of claim 1, further configured to provide the heated fluid from the TES system to the calciner to generate steam for use in steam partial calcination.

15. The calcination system of claim 1, further configured to recirculate the heated fluid back into the TES for reheating, after transferring thermal energy into the material stream at the drier.

16. A method of calcination, including:
storing thermal energy derived at least in part from a variable renewable energy source having intermittent availability by a thermal energy storage (TES) system, by heating a storage medium using electricity from the variable renewable energy source, and delivering useful heat in the form of a heated fluid;
receiving and heating a material stream in a calciner with the heated fluid heated by the TES system, to calcine the material stream, and generate a calcined product; and
evaporating moisture from the material stream having a first moisture content to a second, lower moisture content by transferring thermal energy from the heated fluid provided by the TES system into the material stream prior to entering the calciner.

17. The method of claim 16, wherein the evaporating step is performed by a hydrate drier.

18. The method of claim 16, including heating a second portion of the heated fluid by a fuel burner burning hydrogen or hydrocarbon fuel.

19. The method of claim 18, including operating the fuel burner with combustion air having a higher oxygen composition by volume than in ambient air.

20. The method of claim 16, including removing impurities or volatile substances from the material stream and/or to incur thermal decomposition to the calcined product.

21. The method of claim 16, wherein the fluid is a non-combustive fluid.

22. The method of claim 21, wherein the non-combustive fluid includes carbon dioxide, air, steam, or a mixture of gases.

23. The method of claim 16, wherein the material stream includes aluminum hydroxide, and the calcined product principally includes alumina.

24. The method of claim 16, further including:
pre-heating the material stream by using a preheat cyclone prior to the material stream being received by the calciner;
cooling heated product received from the calciner by using a cooling cyclone coupled to a source of ambient air; and
circulating exhaust fluid back to the TES system from one or both of the preheat cyclone and cooling cyclone as the fluid to be heated by the TES system.

25. The method of claim 24 including using a heat exchanger to receive thermal energy obtained from the exhaust fluid from one or both of the preheat cyclone and cooling cyclone, and applying the thermal energy from the exhaust fluid to heat the fluid that is input to the TES system.

26. The method of claim 16, further including using an electric booster to raise a temperature of the heated fluid delivered by the TES from a first temperature to a second higher temperature.

27. The method of claim 26, further comprising powering a turbine generator with the electric booster.

28. The method of claim 27, further comprising powering a turbine generator with heat from the TES system.

29. The method of claim 16, further including generating steam for use in steam partial calcination by using the heated fluid provided from the TES system to the calciner.

30. The method of claim 16, further including recirculating the heated fluid back into the TES for reheating, after evaporating moisture from the material stream.

31. The method of claim 16, wherein receiving and heating the material stream includes:
injecting the material stream via a first inlet of the calciner; and
injecting, via a second inlet of the calciner, the heated fluid from the TES system to suspend the injected material stream within the calciner.

32. The method of claim 16, further including heating the material stream by burning at least one of oxyfuel and hydrogen in a fuel burner to provide the calciner with heat.

* * * * *